United States Patent
Ono et al.

(10) Patent No.: US 7,822,334 B2
(45) Date of Patent: Oct. 26, 2010

(54) IMAGING DEVICE AND IN-FOCUS CONTROL METHOD

(75) Inventors: Riichi Ono, Osaka (JP); Shinichi Fujii, Osaka (JP); Tomoomi Ito, Hyogo (JP)

(73) Assignee: Sony Corporation, Tokyo (JP)

( * ) Notice: Subject to any disclaimer, the term of this patent is extended or adjusted under 35 U.S.C. 154(b) by 152 days.

(21) Appl. No.: 12/197,662

(22) Filed: Aug. 25, 2008

(65) Prior Publication Data

US 2009/0067828 A1 Mar. 12, 2009

(30) Foreign Application Priority Data

Sep. 11, 2007 (JP) ............... 2007-235150

(51) Int. Cl.
*G03B 3/00* (2006.01)
*G03B 13/00* (2006.01)
*H04N 5/232* (2006.01)
*G02B 7/04* (2006.01)

(52) U.S. Cl. ............... 396/128; 396/123; 348/353; 348/356; 250/201.7

(58) Field of Classification Search ........... 396/128, 396/89, 121, 123, 125–127; 348/345, 348–350, 348/353–356; 250/201.4, 201.6, 201.7, 201.8
See application file for complete search history.

(56) References Cited

U.S. PATENT DOCUMENTS

2004/0057712 A1   3/2004   Sato et al.
2005/0031330 A1   2/2005   Nonaka et al.
2006/0061676 A1   3/2006   Suda
2006/0165403 A1*  7/2006   Ito .......................... 396/123

FOREIGN PATENT DOCUMENTS

EP   1 617 652 A2   1/2006
JP   2003-7944      1/2003

OTHER PUBLICATIONS

U.S. Appl. No. 12/210,589, filed Sep. 15, 2008, Fujii.
U.S. Appl. No. 12/210,560, filed Sep. 15, 2008, Fujii.

* cited by examiner

*Primary Examiner*—Rochelle-Ann J Blackman
(74) *Attorney, Agent, or Firm*—Oblon, Spivak, McClelland, Maier & Neustadt, L.L.P.

(57) ABSTRACT

An imaging device includes an imaging unit that obtains an image signal relating to a subject, a driving unit that drives a focus lens, a first detecting unit that performs focus detection based on a contrast detection method to detect an in-focus position of the focus lens, a second detecting unit that performs focus detection based on a phase difference detection method, while the focus lens is being driven toward the in-focus position, to detect a provisional in-focus position of the focus lens, and an in-focus control unit that controls the driving unit to drive the focus lens to pass through the provisional in-focus position and then return to the in-focus position. Focus detection information is obtained at least for a given range of positions, and is stored in a predetermined storage unit. The in-focus position is detected based on the stored focus detection information.

3 Claims, 16 Drawing Sheets

IMAGING DEVICE AND IN-FOCUS CONTROL METHOD

CROSS REFERENCES TO RELATED APPLICATIONS

The present invention contains subject matter related to Japanese Patent Application JP 2007-235150 filed in the Japanese Patent Office on Sep. 11, 2007, the entire contents of which are incorporated herein by reference.

BACKGROUND OF THE INVENTION

1. Field of the Invention

The present invention relates to an imaging device that allows focus detection based on a contrast detection method and focus detection based on a phase difference detection method.

2. Description of the Related Art

In general, imaging devices such as digital single lens reflex (SLR) cameras perform focus detection based on a phase difference detection method (phase difference AF) using phase difference AF sensors to perform auto-focus control (AF control). Phase difference AF has an advantage of quicker focus detection than focus detection based on a contrast detection method (contrast AF) in which a position of a focus lens at which image signals obtained by an imaging element have a peak level of contrast is detected although it has a drawback of lower focus detection accuracy than contrast AF.

An AF method having the advantages of both phase difference AF and contrast AF, called a hybrid AF method, has been proposed. For example, Japanese Unexamined Patent Application Publication No. 2003-7994 discloses an imaging element capable of obtaining two images at the same time for detecting a phase difference. With the use of such an imaging element, the hybrid AF method can be achieved.

In the hybrid AF method, for example, a focus lens is quickly driven to an in-focus position detected by the phase difference AF method and then the contrast AF method is enabled to perform high-precision focus detection. Thus, AF control having the advantages of both AF methods is realized.

SUMMARY OF THE INVENTION

However, the hybrid AF method described above has a problem. Even if a focus lens is driven to an in-focus position detected by the phase difference AF method, unless the focus lens has passed through a position with a peak level of contrast, the driving of the focus lens is performed by the contrast AF method until the position with the peak level has been detected. In such a case, quick focus detection is not achieved.

It is therefore desirable to provide an imaging device that can stably perform high-speed and high-precision focus detection.

According to an embodiment of the present invention, an imaging device includes imaging means for obtaining an image signal relating to a subject, driving means for driving a focus lens; first detecting means for performing focus detection based on a contrast detection method to detect an in-focus position of the focus lens, second detecting means for performing focus detection based on a phase difference detection method, while the focus lens is being driven by the driving means toward the in-focus position, to execute a provisional position detection process of detecting a provisional in-focus position of the focus lens, and in-focus control means for controlling the driving means to drive the focus lens to pass through the provisional in-focus position and then return to the in-focus position. The first detecting means includes means for executing a focus information obtaining process of obtaining, based on image signals obtained by the imaging means at individual positions of the focus lens driven by the driving means, focus detection information that is used for focus detection based on the contrast detection method, and means for executing an in-focus position detection process of detecting the in-focus position on the basis of the focus detection information obtained in the focus information obtaining process. The in-focus control means includes determining means for determining a stop position of the focus lens by adding a predetermined pass-through amount to the provisional in-focus position detected in the provisional position detection process, first driving control means for controlling driving of the focus lens so that the focus lens moves to the stop position through the provisional in-focus position, focus information storing means for obtaining and storing focus detection information in predetermined storage means, the focus detection information being obtained by performing the focus information obtaining process at least for a given range of positions during the driving of the focus lens controlled by the first driving control means, and second driving control means for controlling driving of the focus lens so that the focus lens reaches an in-focus position that is detected by performing the in-focus position detection process on the basis of the focus detection information stored in the predetermined storage means.

According to another embodiment of the present invention, an in-focus control method for driving a focus lens to an in-focus position in an imaging device, the imaging device including imaging means for obtaining an image signal relating to a subject, and driving means for driving the focus lens, includes the steps of performing focus detection based on a contrast detection method to detect the in-focus position; performing focus detection based on a phase difference detection method, while the focus lens is being driven by the driving means toward the in-focus position, to execute a provisional position detection process of detecting a provisional in-focus position of the focus lens; and controlling the driving means to drive the focus lens to pass through the provisional in-focus position and then return to the in-focus position. The step of detecting includes executing a focus information obtaining process of obtaining, based on image signals obtained by the imaging means at individual positions of the focus lens driven by the driving means, focus detection information that is used for focus detection based on the contrast detection method; and executing an in-focus position detection process of detecting the in-focus position on the basis of the focus detection information obtained in the focus information obtaining process. The step of controlling includes determining a stop position of the focus lens by adding a predetermined pass-through amount to the provisional in-focus position detected in the provisional position detection process; driving the focus lens to move to the stop position through the provisional in-focus position; obtaining focus detection information by performing the focus information obtaining process at least for a given range of positions during the driving of the focus lens to move to the stop position through the provisional in-focus position, and storing the obtained focus detection information in predetermined storage means in the imaging device; and detecting the in-focus position by performing the in-focus position detection process on the basis of the focus detection information stored in the predetermined storage means, and driving the focus lens to the detected in-focus position.

According to an embodiment of the present invention, a stop position of a focus lens is determined by adding a predetermined pass-through amount to a provisional position detected by performing focus detection based on a phase difference detection method. While the focus lens is being driven to move to the stop position through the provisional position, focus detection information used for focus detection based on a contrast detection method is obtained on the basis of image signals obtained by imaging means at individual positions of the focus lens at least within a given range of positions, and is stored in predetermined storage means. An in-focus position is detected based on the focus detection information stored in the predetermined storage means, and the focus lens is driven to the in-focus position. As a result, high-speed and high-accuracy focus detection can be stably performed.

DESCRIPTION OF THE PREFERRED EMBODIMENTS

First Embodiment

Figure 1:
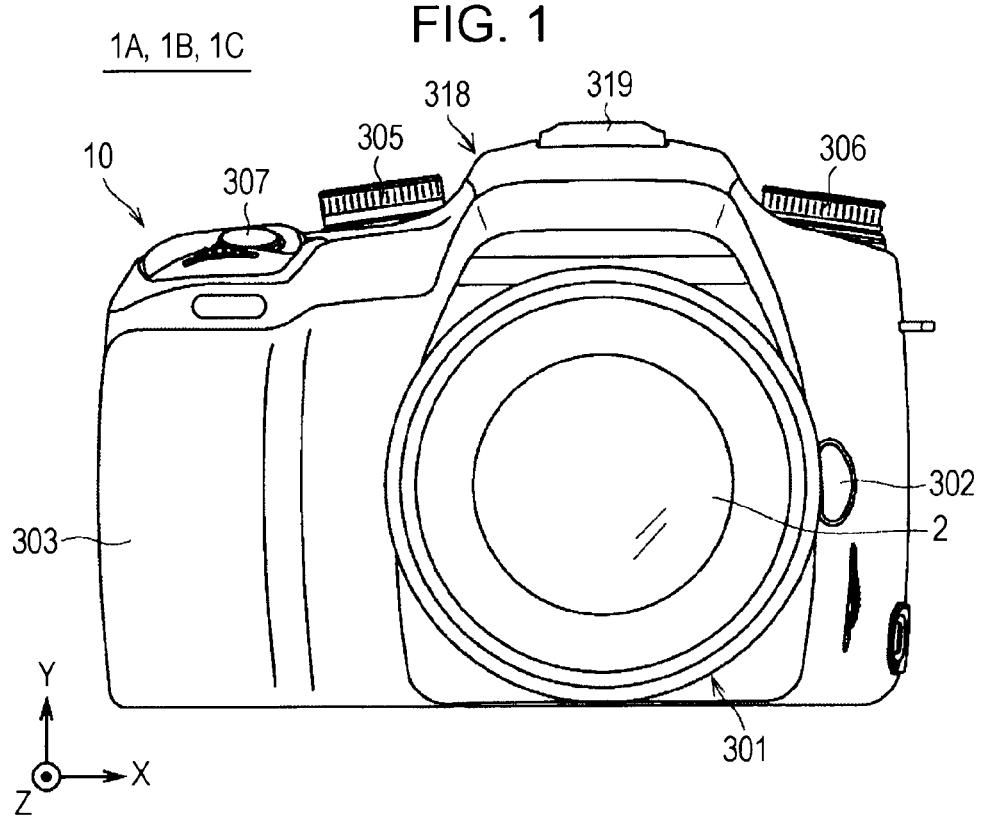
FIG. 1 is a diagram showing an appearance structure of an imaging device according to a first embodiment of the present invention.
Figure 2:
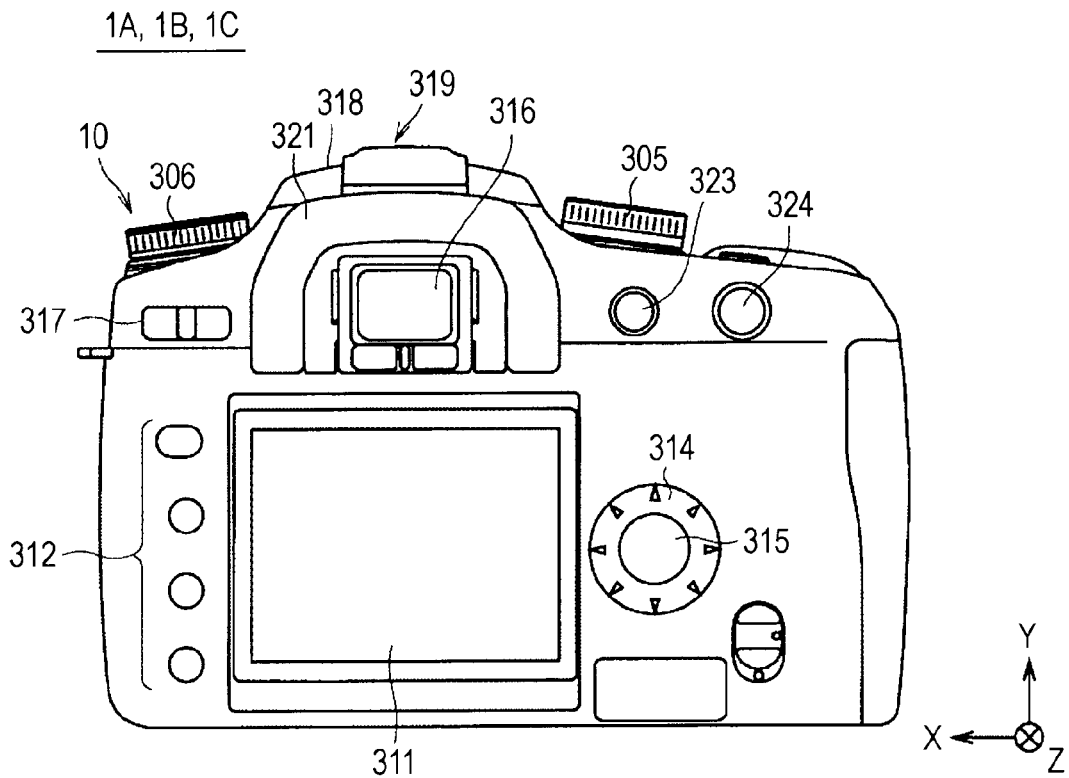
FIG. 2 is a diagram showing an appearance structure of the imaging device.

FIGS. 1 and 2 are diagrams showing an appearance structure of an imaging device 1A according to a first embodiment of the present invention. FIGS. 1 and 2 are front and rear views of the imaging device 1A, respectively.

The imaging device 1A is formed as, for example, a digital SLR still camera, and includes a camera body 10, and an interchangeable lens 2 serving as a photographic lens removably attached to the camera body 10.

Referring to FIG. 1, a mount portion 301 to which the interchangeable lens 2 is attached, a lens replacement button 302, a grip portion 303 that can be held by a user, a mode setting dial 305, a control value setting dial 306, and a shutter button 307 are provided on a front side of the camera body 10. The mount portion 301 is located at substantially the center of the front side of the camera body 10, and the lens replacement button 302 is located on the right side of the mount portion 301. The mode setting dial 305 is located at an upper left portion of the front side, and the control value setting dial 306 is located at an upper right portion of the front side. The shutter button 307 is located at the upper end of the grip portion 303.

Referring to FIG. 2, a liquid crystal display (LCD) 311, setting buttons 312, a cross-key selector 314, and a push button 315 are provided on a rear surface of the camera body 10. The setting buttons 312 are located on the left side of the LCD 311, and the cross-key selector 314 is located on the right side of the LCD 311. The push button 315 is located at the center of the cross-key selector 314. An electronic viewfinder (EVF) 316, an eye cup 321, a main switch 317, an exposure correction button 323, an Auto Exposure (AE) lock button 324, a flash unit 318, and a connection terminal portion 319 are further provided on the rear surface of The camera body 10. The EVF 316 is disposed at an upper position with respect to the LCD 311, and the eye cup 321 is formed around the EVF 316. The main switch 317 is disposed on the left side of the EVF 316. The exposure correction button 323 and the AE lock button 324 are disposed on the right side of the EVF 316, and the flash unit 318 and the connection terminal portion 319 are located in an upper portion of the EVF 316.

The mount portion 301 includes a connector Ec (see FIG. 4) for providing an electrical connection with the interchangeable lens 2 attached to the mount portion 301, and a coupler 75 (see FIG. 4) for providing a mechanical connection with the interchangeable lens 2.

The lens replacement button 302 is a button which is pressed to remove the interchangeable lens 2 attached to the mount portion 301.

The grip portion 303 is a portion with which a user holds the imaging device 1A during a shooting operation, and has finger-shaped contours for a more fitting experience. The grip portion 303 includes a battery receiving chamber and a card receiving chamber (not shown). The battery receiving chamber is designed to receive a battery 69B (see FIG. 4) serving as a camera power source, and the card receiving chamber is designed to removably receive a memory card 67 (see FIG. 4) to record image data of photographed images onto the memory card 67. The grip portion 303 may be provided with a grip sensor configured to detect whether or not a user holds the grip portion 303.

Each of the mode setting dial 305 and the control value setting dial 306 is formed of a substantially disk-shaped member rotatable in a plane substantially parallel to a top surface of the camera body 10. The mode setting dial 305 is operable to select one of modes or functions provided in the imaging device 1A, such as an Auto Exposure (AE) control mode, an Auto Focus (AF) control mode, various shooting modes such as a still-image shooting mode for shooting a still image and a continuous shooting mode for continuously shooting images, and a reproduction mode for reproducing a recorded image. The control value setting dial 306 is arranged to set a control value for each of the functions provided in the imaging device 1A.

The shutter button 307 is a pressing switch which can be pressed halfway ("half-pressed") and which can further be pressed ("fully pressed"). In the still-image shooting mode, when the shutter button 307 is half-pressed, a pre-shooting operation before shooting a still image of a subject (a pre-shooting operation including setting of an exposure control value and focus detection) is executed. Then, when the shutter button 307 is fully pressed, a shooting operation (a series of operations of exposing an imaging element 101 (see FIG. 3) to light, applying predetermined image processing to an image signal obtained by the exposure, and recording the resulting image signal onto a recording medium such as a memory card) is executed.

The LCD 311 includes a color liquid crystal panel capable of displaying an image. The LCD 311 is configured to display an image captured by the imaging element 101 (see FIG. 3) or to reproduce and display a recorded image, and is also configured to display a setting screen for setting the functions or modes provided in the imaging device 1A. In place of the LCD 311, an organic electroluminescent (EL) display device or a plasma display device may be used.

The setting buttons 312 are buttons which are operated to perform the functions provided in the imaging device 1A. Examples of the setting buttons 312 include a selection setting switch for setting an item selected on a menu screen displayed on the LCD 311, a selection cancellation switch, a menu display switch for switching the display on the menu screen, a display on/off switch, and a display magnification switch.

The cross-key selector 314 has an annular member including a plurality of pressing portions (portions marked with triangles shown in FIG. 2) arranged at regular intervals along the circumference thereof, and contacts (switches) (not shown) are provided in correspondence with the pressing portions so that the pressing of one of the pressing portions can be detected by a corresponding one of the contacts. The push button 315 is located at the center of the cross-key selector 314. The cross-key selector 314 and the push button 315 are operable to enter instructions such as an instruction to change the shooting magnification (to move a zoom lens 212 (see FIG. 4) to a wide-angle (wide) side or a telephoto (tele) side), an instruction to set the frame advance feature for advancing frame-by-frame a recorded image to be reproduced on the LCD 311, and an instruction to set shooting conditions (such as the aperture value, the shutter speed, and the turning on or off of flash light).

The EVF 316 includes a liquid crystal panel 310 (see FIG. 3), and is configured to display an image captured by the imaging element 101 (see FIG. 3) or to reproduce and display a recorded image. Prior to actual shooting (shooting for image recording), live-view (preview) display is provided so that a subject can appear on the EVF 316 or the LCD 311 in a movie form on the basis of image signals sequentially generated by the imaging element 101. This allows a user to visually check the subject to be actually photographed by the imaging element 101.

The main switch 317 is formed of a two-contact slide switch slidable to the right and left. When the main switch 317 is set to the left, the imaging device 1A is powered on. When the main switch 317 is set to the right, the imaging device 1A is powered off.

The flash unit 318 is formed as a pop-up built-in flashlight. An external flashlight or the like may be attached to the camera body 10 using the connection terminal portion 319.

The eye cup 321 is a C-shaped light-shielding member having light-shielding properties and capable of blocking external light from entering the EVF 316.

The exposure correction button 323 is a button for manually adjusting the exposure value (aperture value or shutter speed). The AE lock button 324 is a button for fixing the exposure.

The interchangeable lens 2 serves as a lens window through which light (optical image) coming from the subject is received, and also serves as a photographic optical system for directing the subject light into the imaging element 101 provided in the camera body 10. The interchangeable lens 2 can be removed from the camera body 10 by pressing the lens replacement button 302 described above.

The interchangeable lens 2 includes a lens group 21 having a plurality of lenses (see FIG. 4) arranged in series along an optical axis LT. The lens group 21 includes a focus lens 211 (see FIG. 4) configured to perform focus adjustment, and the zoom lens 212 (see FIG. 4) configured to perform variable magnification. The focus lens 211 and the zoom lens 212 are driven in the direction of the optical axis LT (see FIG. 3) to perform focus adjustment and variable magnification, respectively. The interchangeable lens 2 further includes an operating ring at a certain position on an outer circumference of a barrel of the interchangeable lens 2 so as to be rotatable along the outer circumferential surface of the barrel. In response to a manual operation or an automatic operation, the zoom lens 212 moves in the direction of the optical axis LT according to the direction of rotation and the amount of rotation of the operating ring, and is set to a zoom magnification (shooting magnification) corresponding to the position to which the zoom lens 212 moves.

Figure 3:
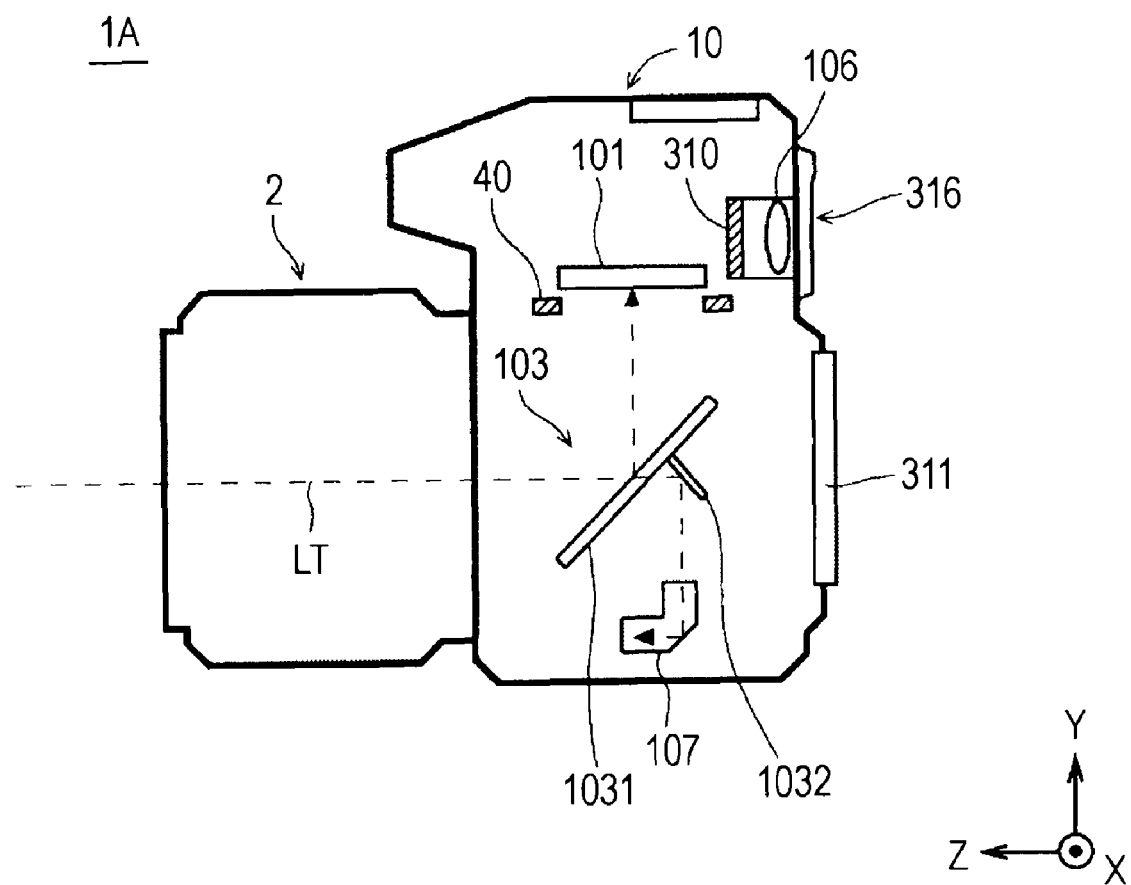
FIG. 3 is a longitudinal cross-sectional view of the imaging device.

Next, an internal structure of the imaging device 1A will be described. FIG. 3 is a longitudinal cross-sectional view of the imaging device 1A. As shown in FIG. 3, the camera body 10 includes the imaging element 101, a mirror unit 103, and a phase difference AF module 107.

The mirror unit 103 is formed as a reflecting member that, on the optical axis LT of the lens group 21 included in the interchangeable lens 2 in a case where the interchangeable lens 2 is attached to the camera body 10, reflects the subject light toward the imaging element 101 provided in an upper portion of the camera body 10. The mirror unit 103 is fixedly mounted in the camera body 10.

The mirror unit 103 includes a main mirror 1031 and a sub-mirror 1032. The sub-mirror 1032 is located on a rear side of the main mirror 1031. The subject light passing through the interchangeable lens 2 is reflected upward by the main mirror 1031 while a portion of the subject light passing through the interchangeable lens 2 is transmitted through the main mirror 1031. The portion of the subject light transmitted through the main mirror 1031 is reflected by the sub-mirror 1032, and the reflected portion of the subject light enters the phase difference AF module 107.

The imaging element 101 is placed in a plane (XZ plane) perpendicular to the Y axis shown in FIG. 3, and receives the subject light reflected by the main mirror 1031. The imaging element 101 is implemented by, for example, a complementary metal-oxide semiconductor (CMOS) color area sensor (CMOS imaging element) with the Bayer pattern. In the Bayer pattern, a plurality of pixels having photodiodes are two-dimensionally arranged in a matrix, and red (R), green (G), and blue (B) color filters having different spectral characteristics are arranged at a ratio of 1:2:1 on light-receiving surfaces of the individual pixels. The imaging element (imaging sensor) 101 generates analog electrical signals (image signals) of red (R), green (G), and blue (B) color components regarding a subject optical image formed through the interchangeable lens 2, and outputs them as R, G, and B color image signals.

A shutter unit 40 is placed in front of the imaging element 101. The shutter unit 40 is formed as a mechanical focal plane shutter configured to perform an optical path opening operation and optical path blocking operation of the subject light directed toward the imaging element 101. If the imaging element 101 is an imaging element that can be completely electronically shuttered, the shutter unit 40 may be omitted.

The phase difference AF module 107 is formed as an AF sensor including a distance measuring element configured to detect focus information regarding the subject. The phase difference AF module 107 is placed in a bottom portion of the mirror unit 103, and performs focus detection based on a phase difference detection method (hereinafter also referred to as "phase difference AF") to detect an in-focus position.

The EVF 316 includes the liquid crystal panel 310 and an eyepiece 106. The liquid crystal panel 310 is formed as, for example, a color liquid crystal panel capable of displaying an image, and is capable of displaying an image captured by the imaging element 101. The eyepiece 106 directs the subject image displayed on the liquid crystal panel 310 to the outside of the EVF 316. With the above-described configuration of the EVF 316, a user can visually check the subject to be photographed by the imaging element 101.

Figure 4:
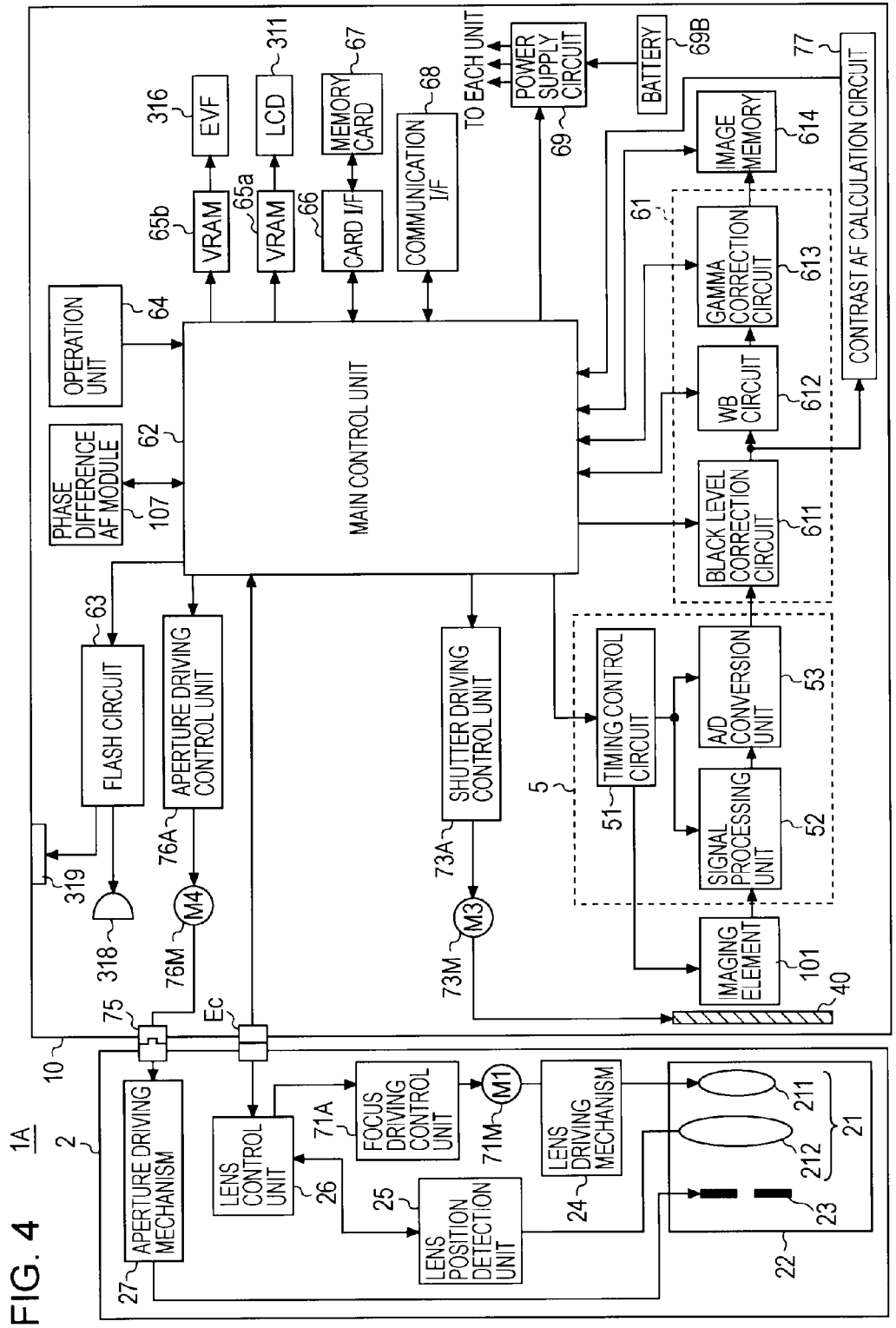
FIG. 4 is a block diagram showing an electrical structure of the imaging device.

FIG. 4 is a block diagram showing an electrical structure of the imaging device 1A. In FIG. 4, members that are the same as or similar to those shown in FIGS. 1 to 3 are assigned the same reference numerals. For the convenience of description, an electrical structure of the interchangeable lens 2 will be described first.

The interchangeable lens 2 includes, in addition to the lens group 21 forming the photographic optical system described above, a lens driving mechanism 24, a lens position detection unit 25, a lens control unit 26, and an aperture driving mechanism 27.

In the lens group 21, the focus lens 211, the zoom lens 212, and an aperture 23 configured to adjust the amount of light incident on the imaging element 101 provided in the camera body 10 are held in the direction of the optical axis LT (see FIG. 3) within the barrel, and an optical image of the subject is received and formed on the imaging element 101. In AF control, an AF actuator 71M provided in the interchangeable lens 2 drives the focus lens 211 in the direction of the optical axis LT to perform focus control.

A focus driving control unit 71A is configured to generate a drive control signal for the AF actuator 71M, which is necessary to move the focus lens 211 to an in-focus position, on the basis of an AF control signal supplied from a main control unit 62 through the lens control unit 26. The AF actuator 71M includes a stepping motor, and applies a lens driving force to the lens driving mechanism 24.

The lens driving mechanism 24 includes, for example, a helicoid and a gear (not shown) that causes the helicoid to rotate. In response to a driving force received from the AF actuator 71M, the lens driving mechanism 24 drives the focus lens 211 or any other suitable component in a direction parallel to the optical axis LT. The direction of movement and the amount of movement of the focus lens 211 are determined according to the direction of rotation and the rotational speed of the AF actuator 71M, respectively.

The lens position detection unit 25 includes an encoder plate having a plurality of code patterns defined at predetermined pitches in the direction of the optical axis LT within a movable range of the lens group 21, and an encoder brush that moves along with the lens group 21 in slidable contact with the encoder plate. The lens position detection unit 25 is configured to detect the amount of movement of the lens group 21 during focus control. A lens position detected by the lens position detection unit 25 is output as, for example, the number of pulses.

The lens control unit 26 includes, for example, a microcomputer having a built-in memory such as a read-only memory (ROM) that stores a control program or a flash memory that stores data regarding status information.

The lens control unit 26 has a communication function of performing communication with the main control unit 62 of the camera body 10 through the connector Ec. Thus, status information data of the lens group 21, such as the focal length, the exit pupil position, the aperture value, the in-focus distance, and the amount of ambient light, and position information of the focus lens 211 detected by the lens position detection unit 25 can be transmitted to the main control unit 62. Moreover, for example, data regarding the amount of driving of the focus lens 211 can be received from the main control unit 62.

The aperture driving mechanism 27 is configured to change the aperture diameter of the aperture 23 in response to a driving force received from an aperture driving actuator 76M through the coupler 75.

Next, an electrical structure of the camera body 10 will be described. The camera body 10 includes, in addition to the components described above, such as the imaging element 101 and the shutter unit 40, an analog front end (AFE) 5, an image processing unit 61, an image memory 614, the main control unit 62, a flash circuit 63, an operation unit 64, video random access memories (VRAMs) 65 (65a and 65b), a card interface (I/F) 66, the memory card 67, a communication I/F 68, a power supply circuit 69, the battery 69B, a shutter driving control unit 73A, a shutter driving actuator 73M, an aperture driving control unit 76A, and the aperture driving actuator 76M.

As described above, the imaging element 101 is formed of a CMOS color area sensor. A timing control circuit 51, described below, controls an imaging operation such as the start (and end) of the exposure operation of the imaging element 101, the output selection of individual pixels included in the imaging element 101, and the reading of pixel signals.

The AFE 5 is configured to supply timing pulses to the imaging element 101 to perform a predetermined operation, and to apply predetermined signal processing to image signals output from the imaging element 101 (a group of analog signals corresponding to beams of light received by the individual pixels of the CMOS area sensor) to convert them into digital signals, which are then output to the image processing unit 61. The AFE 5 includes the timing control circuit 51, a signal processing unit 52, and an analog-to-digital (A/D) conversion unit 53.

The timing control circuit 51 generates predetermined timing pulses (such as a vertical scanning pulse φVn, a horizontal scanning pulse φVm, and a pulse for generating a reset signal φVr) on the basis of a reference clock signal output from the main control unit 62, and outputs them to the imaging element 101 to control the imaging operation of the imaging element 101. By outputting the predetermined timing pulses to the signal processing unit 52 and the A/D conversion unit 53, the operation of the signal processing unit 52 and the A/D conversion unit 53 is controlled.

The signal processing unit 52 is configured to apply predetermined analog signal processing to analog image signals output from the imaging element 101. The signal processing unit 52 includes a correlated double sampling (CDS) circuit, an automatic gain control (AGC) circuit, and a clamp circuit. The A/D conversion unit 53 is configured to convert analog R, G, and B image signals output from the signal processing unit 52 into digital image signals having a plurality of bits (for example, 12 bits) on the basis of timing pulses output from the timing control circuit 51.

The image processing unit 61 is configured to perform predetermined signal processing on image data output from the AFE 5 to create an image file, and includes a black level correction circuit 611, a white balance control circuit 612, and a gamma correction circuit 613. The image data received by the image processing unit 61 is written to the image memory 614 in synchronization with the reading operation of the imaging element 101. Afterwards, the image data written in the image memory 614 is accessed and is subjected to processing in the respective blocks of the image processing unit 61.

The black level correction circuit 611 is configured to correct the black level of the A/D converted digital R, G, and B image signals obtained by the A/D conversion unit 53 into a reference black level.

The white balance control circuit 612 is configured to perform level conversion (white balance (WB) adjustment) of the digital signals of the red (R), green (G), and blue (B) color components on the basis of reference white in accordance with a light source. That is, the white balance control circuit 612 specifies, based on WB adjustment data supplied from the main control unit 62, a portion that is estimated, from the luminance or chroma data, to be a white portion in the photographed subject, and determines a mean of the R, G, and B color components in the specified portion, as well as a G/R ratio and a G/B ratio. The mean, the G/R ratio, and the G/B ratio are used as R and B correction gains to perform level correction.

The gamma correction circuit 613 is configured to correct grayscale characteristics of the WB-adjusted image data. Specifically, the gamma correction circuit 613 performs non-linear transformation on the levels of the image data using a gamma correction table that is set in advance for each of the color components, and also performs offset adjustment.

The image memory 614 is a memory that, in a shooting mode, temporarily stores image data output from the image processing unit 61 and that is used by the main control unit 62 as a work area for performing a predetermined process on the image data. In a reproduction mode, the image memory 614 temporarily stores image data read from the memory card 67.

The main control unit 62 includes, for example, a microcomputer having a built-in storage unit such as a ROM that stores a control program or a RAM that temporarily stores data, and is configured to control the operation of individual components of the imaging device 1A.

The flash circuit 63 is configured to, in a flash shooting mode, control the amount of light emitted from the flash unit 318 or an external flashlight connected to the connection terminal portion 319 to an amount of light designated by the main control unit 62.

The operation unit 64 includes the mode setting dial 305, the control value setting dial 306, the shutter button 307, the setting buttons 312, the cross-key selector 314, the push button 315, and the main switch 317, described above, and is configured to input operation information to the main control unit 62.

The VRAMs 65a and 65b are buffer memories having a storage capacity of image signals corresponding to the number of pixels of the LCD 311 and the EVF 316, respectively, and are provided between the main control unit 62 and the LCD 311 and between the main control unit 62 and the EVF 316, respectively. The card I/F 66 is an interface that allows transmission and reception of signals between the memory card 67 and the main control unit 62. The memory card 67 is a recording medium on which image data generated by the main control unit 62 is stored. The communication I/F 68 is an interface configured to allow transmission of image data and other suitable data to a personal computer or any other suitable external device.

The power supply circuit 69 is formed of, for example, a constant voltage circuit, and generates a voltage for driving the overall imaging device 1A including a control unit, such as the main control unit 62, the imaging element 101, and various other driving units. The imaging element 101 is energized under control of a control signal supplied from the main control unit 62 to the power supply circuit 69. The battery 69B includes a primary battery such as an alkaline battery and a secondary battery such as a nickel metal-hydride rechargeable battery, and serves as a power source that supplies power to the overall imaging device 1A.

The shutter driving control unit 73A is configured to generate a drive control signal for the shutter driving actuator 73M on the basis of a control signal supplied from the main control unit 62. The shutter driving actuator 73M is an actuator that drives the shutter unit 40 to open and close.

The aperture driving control unit 76A is configured to generate a drive control signal for the aperture driving actuator 76M on the basis of a control signal supplied from the main control unit 62. The aperture driving actuator 76M applies a driving force to the aperture driving mechanism 27 through the coupler 75.

The camera body 10 further includes a contrast AF calculation circuit 77 that calculates a contrast AF evaluation value (hereinafter also referred to as an "AF evaluation value"), which is necessary for focus detection based on the contrast detection method (contrast AF), on the basis of the black-level-corrected image data output from the black level correction circuit 611. That is, in the contrast AF calculation circuit 77, a process (focus information obtaining process) of determining and obtaining AF evaluation values (focus detection information) based on image signals obtained by the imaging element 101 at individual positions of the focus lens 211 driven by the AF actuator 71M is executed. The AF evaluation values are determined by, for example, reading pixel signals of a given pixel group (for example, a G pixel group) within an AF area designated in a portion (for example, a center portion) of a shooting range and calculating the sum of absolute values of differences between adjacent pixels in the given pixel group within the AF area.

In AF control, the main control unit 62 executes a process of detecting an in-focus position of the focus lens 211 using the contrast AF on the basis of the AF evaluation values determined by the contrast AF calculation circuit 77 and the position information of the focus lens 211 detected by the lens position detection unit 25.

The AF control performed by the imaging device 1A having the structure described above will now be described in detail.

The imaging device 1A has a structure capable of executing phase difference AF using the phase difference AF module 107 and contrast AF using the contrast AF calculation circuit 77 in parallel at the same time, or a structure capable of performing hybrid AF. That is, the imaging device 1A is capable of performing parallel processes including a process (provisional position detection process) of detecting an in-focus position (provisional in-focus position, described below) using the phase difference AF method, and a process (focus information obtaining process) of obtaining AF evaluation values (focus detection information) on the basis of image signals generated by the imaging element 101 at individual positions of the focus lens 211 driven by the AF actuator 71M.

The phase difference AF method allows relatively high-speed focus detection but may cause a deviation (error) of the focus detection with a depth of focus of 2 μm or more, resulting in low detection precision. In the hybrid AF of the imaging device 1A, therefore, in order to determine an in-focus position of the focus lens 211, a phase difference AF process (provisional position detection process) for detecting a provisional in-focus position of the focus lens 211 (hereinafter also referred to as a "provisional in-focus position") is executed with the focus lens 211 driven toward the in-focus position using the AF actuator 71M, and then a position at which a peak AF evaluation value is obtained among a history of AF evaluation values determined in the vicinity of the provisional position is specified as a finally obtained in-focus position (final in-focus position).

Specifically, when the shutter button 307 is half-pressed and AF control is started, first, the focus lens 211 is quickly driven toward an in-focus position on the basis of a detection result obtained in the phase difference AF, and a predetermined offset α (for example, several tens of micrometers (μm) to several hundreds of micrometers (μm)) is added to a provisional in-focus position detected by the phase difference AF method to ensure that the focus lens 211 can pass through the provisional in-focus position. Meanwhile, image signals used to determine AF evaluation values are sequentially obtained by the imaging element 101 after the AF control is started, and AF evaluation values based on the obtained image signals are determined by the contrast AF calculation circuit 77. Individual positions of the focus lens 211 detected by the lens position detection unit 25 and AF evaluation values based on image signals obtained at the individual positions are stored in, for example, the RAM of the main control unit 62 in association with each other.

After the focus lens 211 is driven to pass through the provisional in-focus position detected by the phase difference AF method by the offset α in the manner described above, the driving of the focus lens 211 is terminated. Thus, the relationship shown in FIG. 5 between the positions of the focus lens 211 and the AF evaluation values, in which the AF evaluation values monotonically increase to reach a peak value Qk and then monotonically decrease, can be reliably obtained. Therefore, the final in-focus position can be correctly detected by the contrast AF method.

Figure 5:
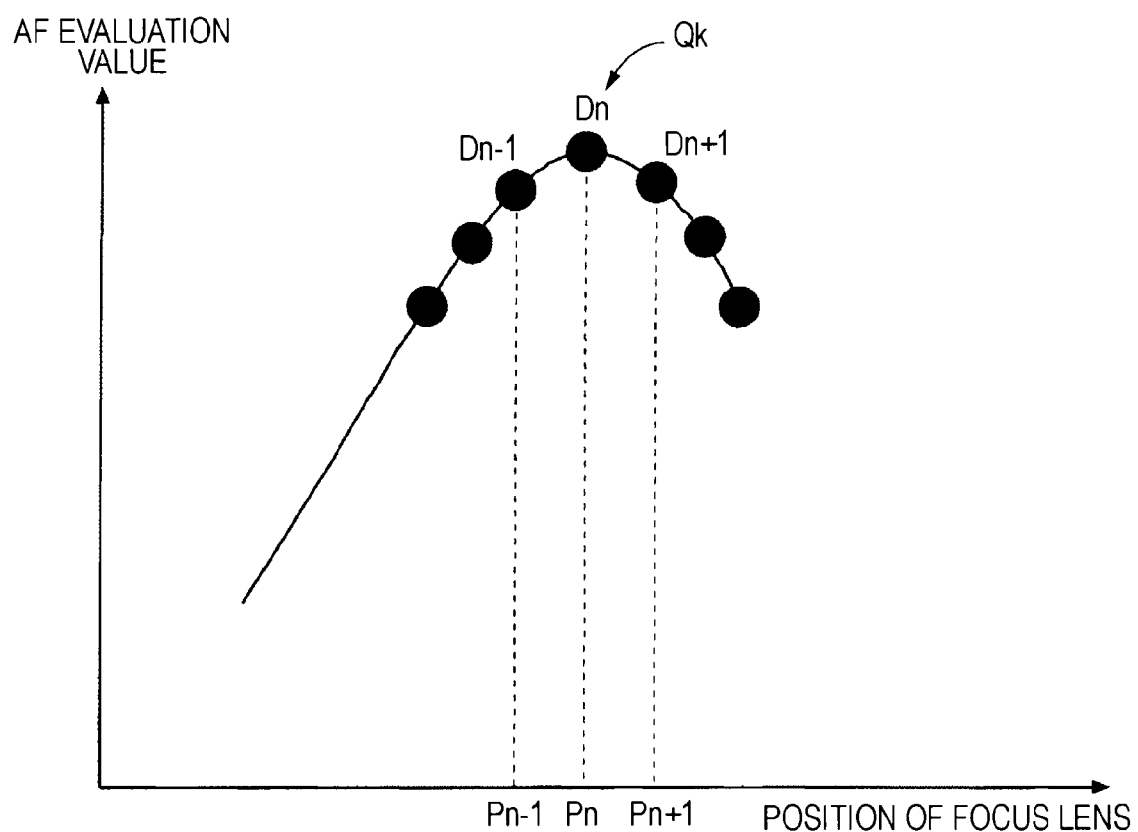
FIG. 5 is a diagram showing the detection of an in-focus position based on contrast AF.

Specifically, a final in-focus position Pf of the focus lens 211 can be determined using the quadratic interpolation approximation given by Equation (1) below on the basis of AF evaluation values Dn−1, Dn, and Dn+1 in the vicinity of the peak value Qk shown in FIG. 5 and positions Pn−1, Pn, and Pn+1 of the focus lens 211:

$$Pf = \frac{D_{n-1}(P_{n+1}^2 - P_n^2) + D_n(P_{n-1}^2 - P_{n+1}^2) + D_{n+1}(P_n^2 - P_{n-1}^2)}{2\left\{ D_{n-1}(P_{n+1} - P_n) + D_n(P_{n-1} - P_{n+1}) + D_{n+1}(P_n - P_{n-1}) \right\}} \quad (1)$$

The focus lens 211 is driven to the thus determined final in-focus position Pf, thus achieving high-precision AF control. With the use of hybrid AF described above, high-speed AF control can be realized, which will be described hereinafter.

Figure 6A:
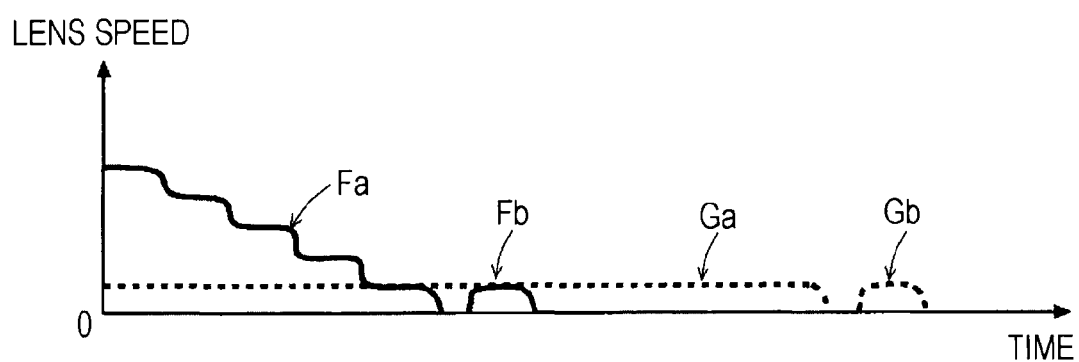
FIGS. 6A and 6B are diagrams showing the operation of hybrid AF performed by the imaging device.
Figure 6B:
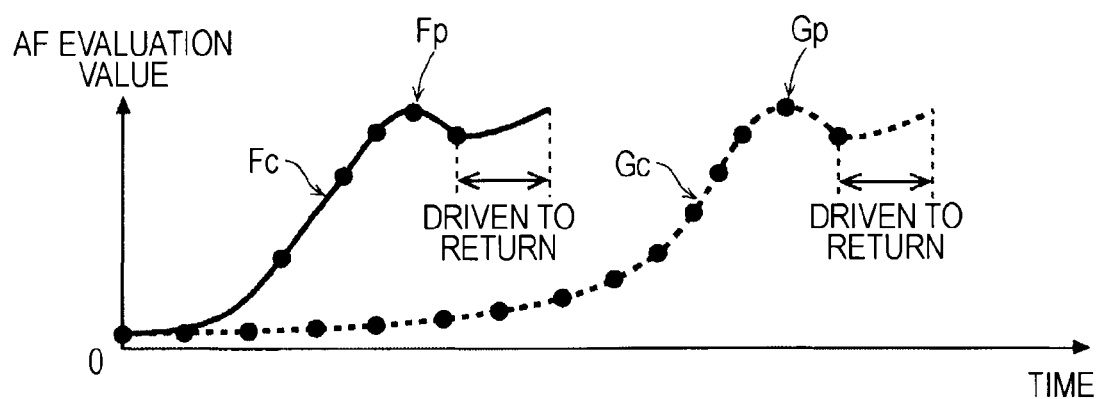

FIGS. 6A and 6B are diagrams showing a hybrid AF operation of the imaging device 1A. In FIGS. 6A and 6B, the abscissa represents time after the AF control is started. In FIG. 6A, the ordinate represents the (absolute value of) driving speed of the focus lens 211. In FIG. 6B, the ordinate represents the AF evaluation value. In FIG. 6B, the AF evaluation values sequentially determined by the contrast AF calculation circuit 77 are plotted as black circles.

In the hybrid AF operation of the imaging device 1A, as described above, by adding the offset α to the provisional in-focus position detected by the phase difference AF method, the focus lens 211 is driven to reliably pass through the in-focus position, and then the focus lens 211 is driven to return to the final in-focus position determined by the contrast AF method on the basis of the history of AF evaluation values.

Specifically, while the focus lens 211 is being moved from a lens position that is set when the AF control is started to a stop position that is determined by adding the offset α to the provisional in-focus position, as indicated by a solid curve Fa shown in FIG. 6A, the driving speed of the focus lens 211 can be set to a high speed if the distance to the in-focus position is large. Thus, the time involved from the start to end of the driving of the focus lens 211 can be reduced. The position at which the driving of the focus lens 211 is terminated is equal to the position determined by adding the offset α to the provisional in-focus position. Thus, as indicated by a solid curve Fc shown in FIG. 6B, a peak AF evaluation value Fp is passed.

Accordingly, while the focus lens 211 is being driven to the stop position determined by adding the offset α to the provisional in-focus position, AF evaluation values are obtained for a moving range of the focus lens 211 including a certain range of positions. Then, the obtained AF evaluation values are sequentially stored in the RAM of the main control unit 62. After the focus lens 211 has reached the stop position, a final in-focus position is detected by the contrast AF method on the basis of the history of AF evaluation values stored in the RAM of the main control unit 62. The focus lens 211 is driven to return to the determined final in-focus position (as indicated by a solid curve Fb shown in FIG. 6A), and therefore the AF control based on hybrid AF is completed.

In a case where AF control is performed using only the contrast AF method, on the other hand, as indicated by a dotted curve Ga shown in FIG. 6A, the focus lens 211 is driven at a relatively low speed until an in-focus position, or a peak AF evaluation value, has been detected. In this case, the time involved from the start to end of the driving of the focus lens 211 is longer than that of the hybrid-AF-based AF control described above. As indicated by a dotted curve Gc shown in FIG. 6B, since the focus lens 211 stops after passing through a peak AF evaluation value Gp, the focus lens 211 is driven to return (as indicated by a dotted curve Gb shown in FIG. 6A) to a final in-focus position specified on the basis of a history of AF evaluation values. Thus, the AF control is completed.

In the hybrid AF operation of the imaging device 1A, therefore, the focus lens 211 is driven at a relatively high speed to a stop position that is determined by adding the offset α to the provisional in-focus position detected by the phase difference AF method, and contrast AF is performed based on a history of AF evaluation values obtained during this driving operation. Thus, more rapid AF control can be achieved than AF control based on only the contrast AF method.

The operation of the imaging device 1A capable of performing such a hybrid AF operation will now be specifically described.

Figure 7:
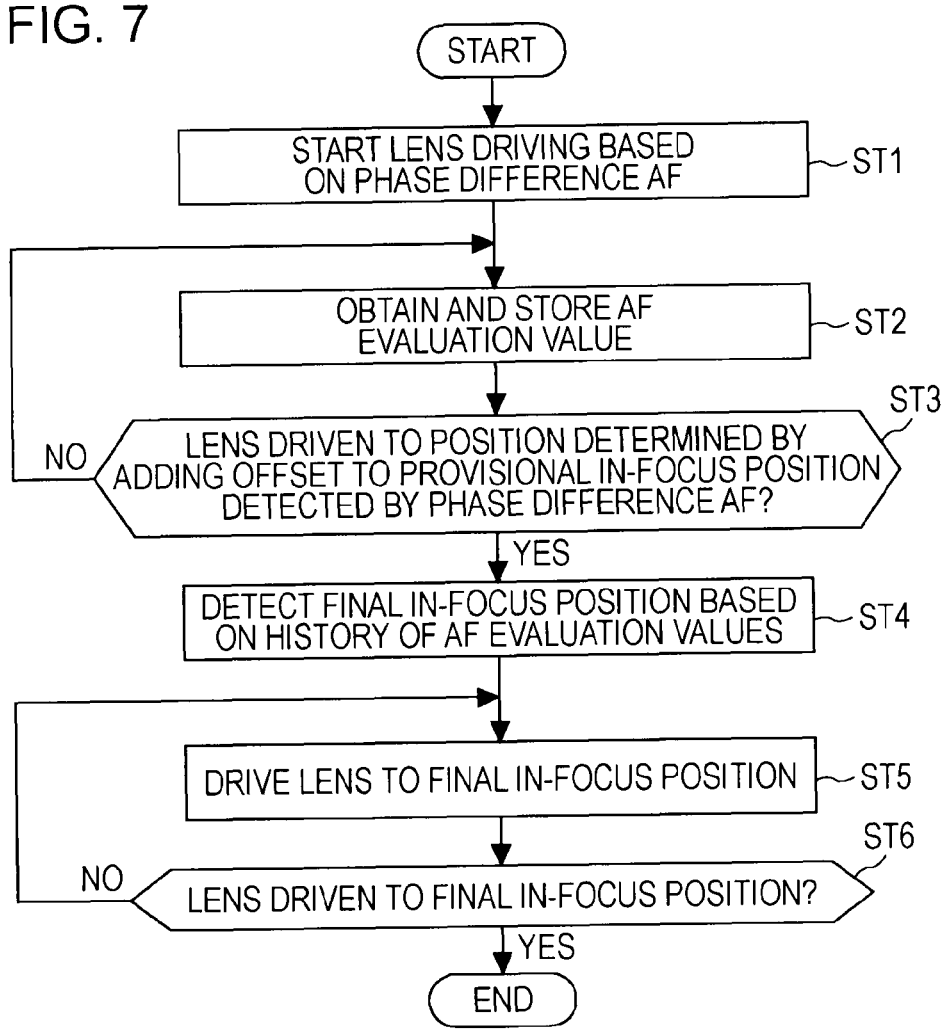
FIG. 7 is a flowchart showing a basic operation of the imaging device.

FIG. 7 is a flowchart showing a basic operation of the imaging device 1A. The operation of the imaging device 1A shown in FIG. 7 corresponds to, in particular, an AF control operation after the shutter button 307 is half-pressed, and is executed by the main control unit 62.

In step ST1, the driving of the focus lens 211 based on the phase difference AF method is started in response to an output signal of the phase difference AF module 107.

In step ST2, AF evaluation values used in the contrast AF method are obtained at individual positions of the focus lens 211 during the driving of the focus lens 211, and are stored in the RAM of the main control unit 62. A process for obtaining and storing the AF evaluation values (focus detection information) can be started before a provisional in-focus position is detected by the phase difference AF method because the imaging device 1A is capable of performing hybrid AF, that is, both the phase difference AF module 107 and the imaging element 101 are capable of receiving subject light at the same time.

In the process of obtaining AF evaluation values in step ST2, preferably, AF evaluation values are determined based on image signals obtained when the pixel read cycle of the imaging element 101 is set to 240 frames per second (fps). If the driving speed of the lens group 21 provided in the interchangeable lens 2 is taken into account, the setting of the pixel read cycle to 240 fps allows the driving pitch of the focus lens 211 to range from about twice to about four times the depth of field (depth of focus), resulting in a substantially correct driving pitch.

In step ST3, it is determined whether or not the driving of the focus lens 211 to the position (stop position) determined by adding the offset α to the provisional in-focus position detected by the phase difference AF method has been completed. That is, it is determined whether or not the focus lens 211 has reached the stop position determined by adding the offset α to the provisional in-focus position. If the driving of the focus lens 211 has been completed, the process proceeds to step ST4. If the driving has not been completed, the process returns to step ST2.

In step ST4, a final in-focus position of the focus lens 211 is detected by the contrast AF method on the basis of the history of AF evaluation values obtained and stored in step ST2. In this case, for example, Equation (1) is used to determine the final in-focus position Pf.

In step ST5, the focus lens 211 is driven to the final in-focus position detected in step ST4.

In step ST6, it is determined whether or not the driving of the focus lens 211 to the final in-focus position has been completed. That is, it is determined whether or not the focus lens 211 has reached the final in-focus position. If the driving of the focus lens 211 has been completed, the flowchart is exited and the AF control ends. If the driving has not been completed, the process returns to step ST5.

In the imaging device 1A described above, a stop position of the focus lens 211 is determined by adding an offset (pass-through amount) α to a provisional in-focus position detected by the phase difference AF method is determined, and the focus lens 211 is driven to pass through the provisional in-focus position and to reach the stop position described above. Then, based on a history of AF evaluation values obtained during the driving of the focus lens 211, a final in-focus position of the focus lens 211 is detected by the contrast AF method. Therefore, high-accuracy and high-speed focus detection can be stably performed.

In the imaging device 1A, furthermore, the offset α is set so that an error of the focus detection caused by the phase difference AF method can be absorbed (for example, the offset α is set to a value equal to or more than a focus detection error (in micrometers (μm))). Therefore, even the phase difference AF module 107 with a low focus detection precision can also be used, thus saving the cost of a phase difference AF module.

Second Embodiment

An imaging device 1B according to a second embodiment of the present invention has an appearance structure similar to that of the imaging device 1A of the first embodiment shown in FIGS. 1 to 2, but has a different internal structure.

Figure 8:
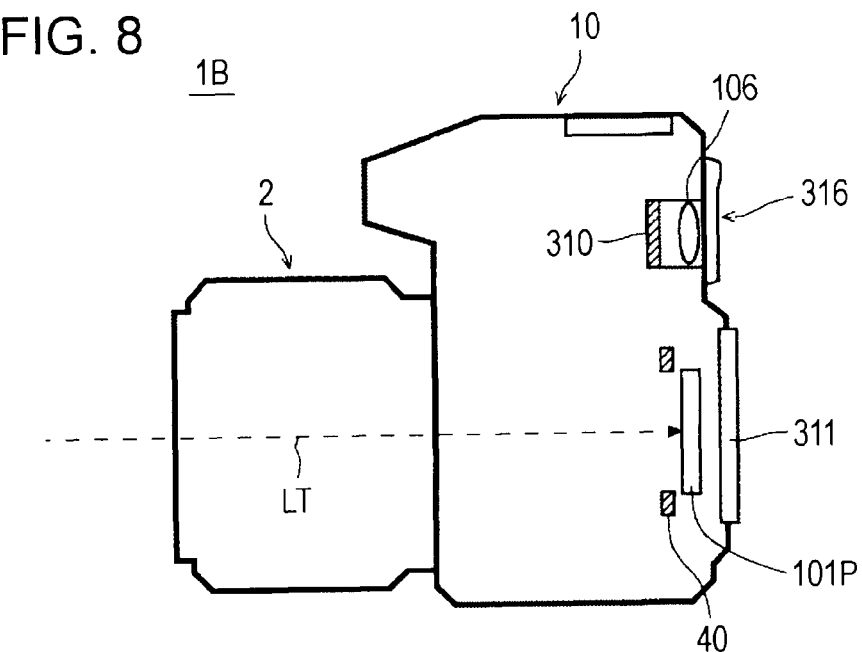
FIG. 8 is a longitudinal cross-sectional view showing an internal structure of an imaging device according to a second embodiment of the present invention.

FIG. 8 is a longitudinal cross-sectional view showing an internal structure of the imaging device 1B.

The imaging device 1B includes an imaging element 101P (the details of which are described below) having a phase difference AF function. In the imaging device 1B, therefore, the phase difference AF module 107, which is provided in the imaging device 1A (see FIG. 3) of the first embodiment, is omitted.

In the imaging device 1B, furthermore, the mirror unit 103, which is provided in the imaging device 1A (see FIG. 3), is also omitted. Due to the absence of the mirror unit 103, the imaging element 101P and a shutter unit 40 are located in a plane perpendicular to an optical axis LT of an interchangeable lens 2.

An electrical structure of the imaging device 1B having the internal structure described above will now be described.

Figure 9:
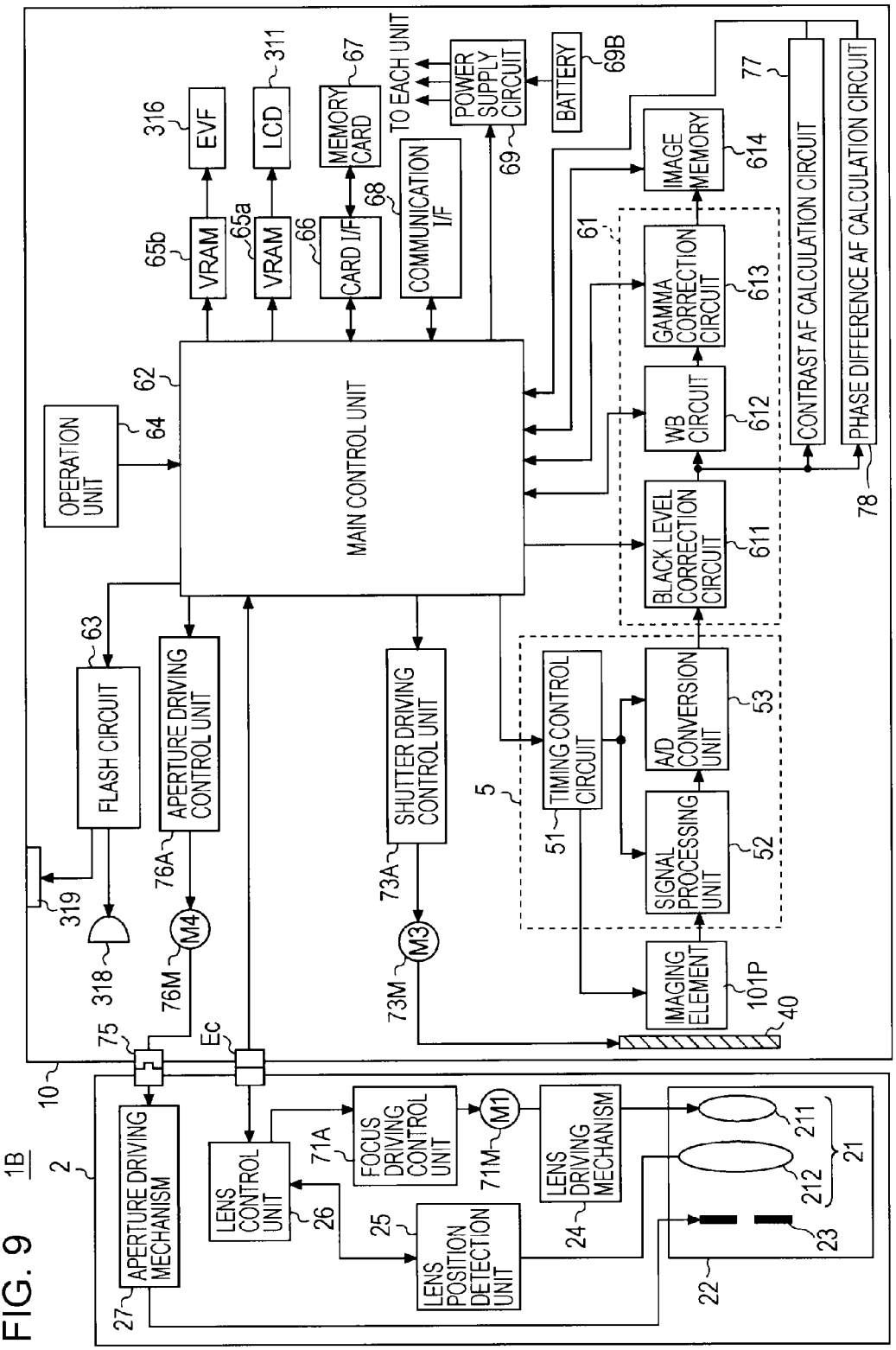
FIG. 9 is a block diagram showing an electrical structure of the imaging device.

FIG. 9 is a block diagram showing an electrical structure of the imaging device 1B.

The imaging device 1B has an electrical structure similar to that of the imaging device 1A (see FIG. 4) of the first embodiment, but is different from the imaging device 1A in that, in place of the phase difference AF module 107, a phase difference AF calculation circuit 78 is provided.

The phase difference AF calculation circuit 78 is a section configured to perform calculation necessary for phase difference AF on the basis of the black-level-corrected image data output from the black level correction circuit 611.

AF control performed by the imaging element 101P using the phase difference AF calculation circuit 78 will now be described in detail.

The imaging device 1B is configured to allow phase difference AF in which transmitted light beams transmitted (passing) through different portions of an exit pupil are received by the imaging element 101P to perform focus detection. The configuration of the imaging element 101P and the principle of phase difference AF using the imaging element 101P will now be described.

Figure 10:
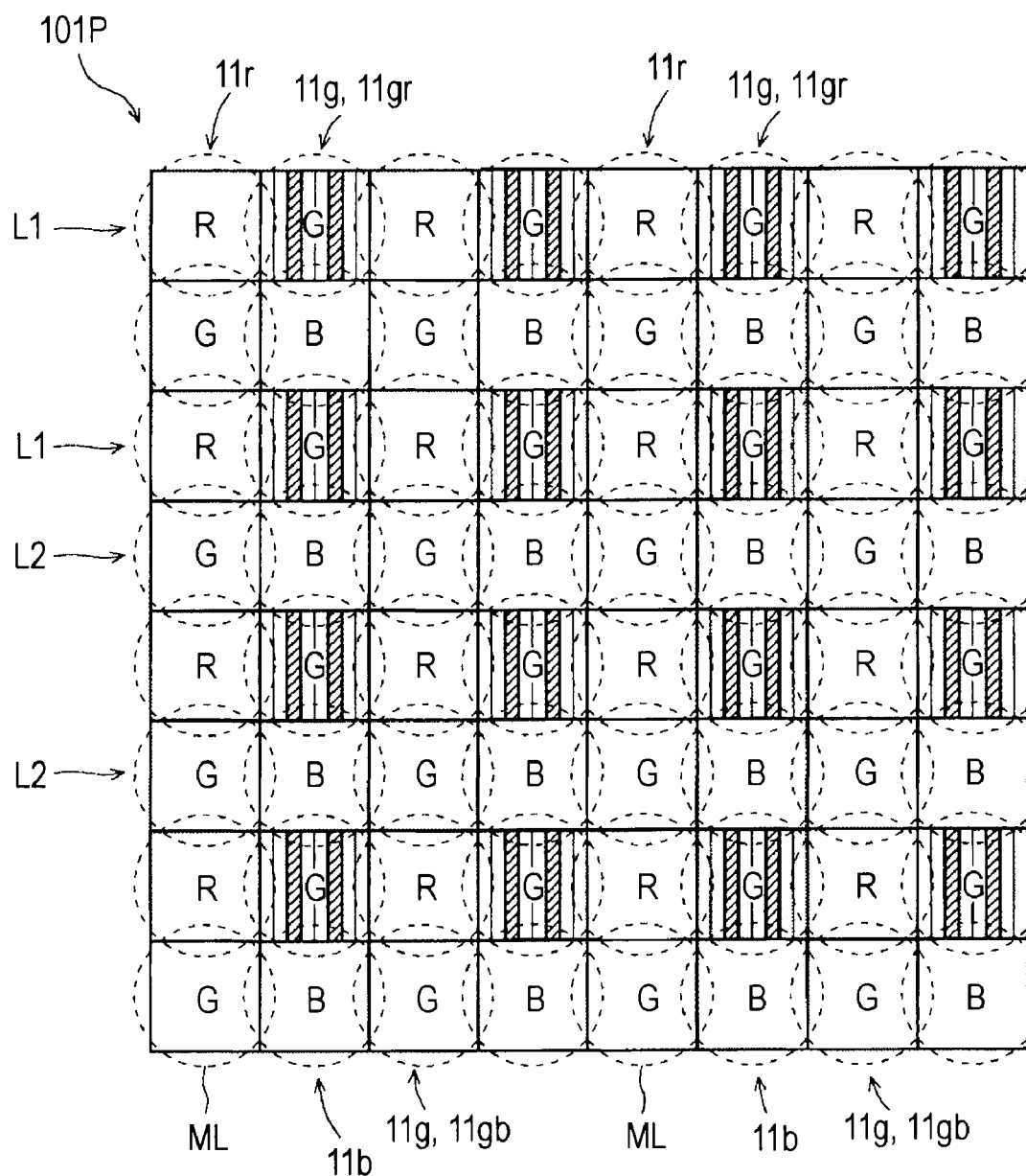
FIG. 10 is a diagram showing a structure of an imaging element according to the second embodiment.

FIG. 10 is a diagram showing a structure of the imaging element 101P.

The imaging element 101P includes R pixels 11r, G pixels 11g, and B pixels 11b configured such that red (R), green (G), and blue (B) color filters are disposed on photodiodes, and each of the pixels 11 (11r, 11g, and 11b) has a single microlens ML. In FIG. 10, for the convenience of illustration, adjacent microlenses ML are shown so as to have overlapping portions. In actuality, however, the microlenses ML are arranged so as not to overlap each other.

Figure 11:
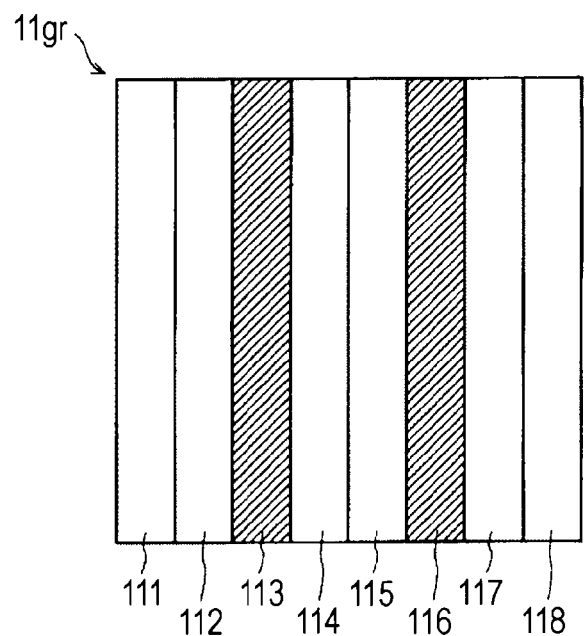
FIG. 11 is a diagram showing a structure of a green (G) pixel segmented into pixel portions.

The G pixels 11g include a plurality of G pixels 11gr arranged along Gr lines L1 (in the horizontal direction), and a plurality of G pixels 11gb arranged along Gb lines L2. Each of the G pixels 11gr arranged along the Gr lines L1 is segmented into eight pixel portions in the direction of the Gr lines L1. That is, in each of the G pixels 11gr, as shown in FIG. 11, eight photoelectric conversion units 111 to 118 are arranged in the direction of the Gr lines L1, and each of the photoelectric conversion units 111 to 118 has an independent photodiode so that electric charge accumulated by photoelectric conversion can be read. The imaging element 101P is configured to read electric charge in a different way between the G pixels 11gr that are segmented into pixel portions and the pixels that are not segmented into pixel portions (i.e., the G pixels 11gb, the R pixels 11r, and the B pixels 11b) so that the electric charge can be simultaneously read. The G pixels 11gr that are segmented into pixel portions are hereinafter referred to as "segmented G pixels" (also referred to simply as "segmented pixels"), and the G pixels 11gb that are not segmented into pixel portions are hereinafter referred to as "non-segmented G pixels" (also referred to as "non-segmented pixels").

Next, the principle of phase difference AF using the imaging element 101P including the segmented G pixels 11gr will be described.

Figure 12:
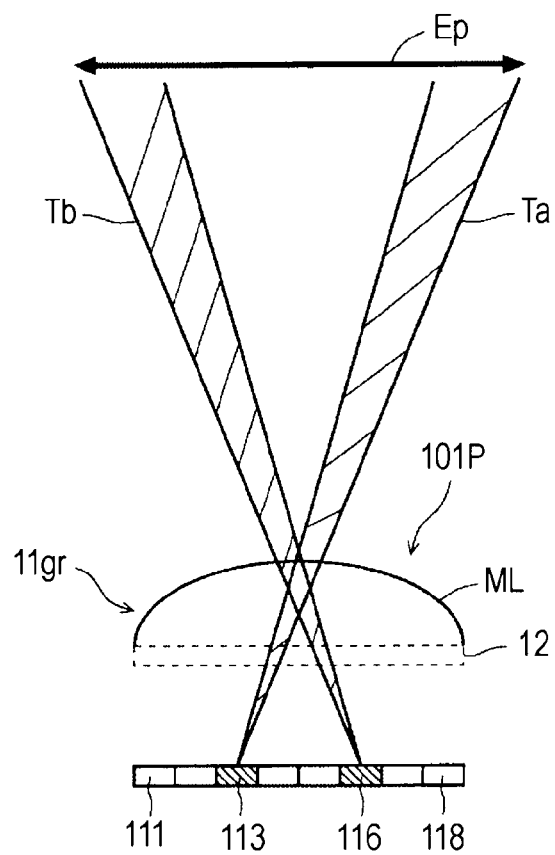
FIG. 12 is a diagram showing the principle of phase difference AF using the imaging element according to the second embodiment.

FIG. 12 is a diagram showing the principle of phase difference AF using the imaging element 101P.

In a case where the actual aperture of the interchangeable lens 2 is set to, for example, F5.6, in each of the segmented G pixels 11gr, a light flux Ta passing through a right portion of an exit pupil Ep is transmitted through a green color filter 12 and is focused on the photoelectric conversion unit 113, which is the third one from the left end of the segmented G pixel 11gr, and a light flux Tb passing through a left portion of the exit pupil Ep is transmitted through the green color filter 12 and is focused on the photoelectric conversion unit 116, which is the sixth one from the left end (or the third one from the right end) of the segmented G pixel 11gr. That is, the plurality of non-segmented pixels including the non-segmented G pixels 11gb, the R pixels 11r, and the B pixels 11b receive a subject light flux passing through an entire region of the exit pupil Ep of the interchangeable lens 2 while the plurality of segmented G pixels 11gr receive the subject light fluxes Ta and Tb transmitted through the pair of partial regions of the exit pupil Ep of the interchangeable lens 2. The received-light data obtained from the photoelectric conversion units 113 is hereinafter referred to as "A-type data", and the received-light data obtained from the photoelectric conversion units 116 is hereinafter referred to as "B-type data". The principle of phase difference AF will be described with reference to FIGS. 13 to 17. FIGS. 13 to 17 show A-type data and B-type data, which are obtained from, for example, a plurality of segmented G pixels 11gr arranged on one of the Gr lines L1 (see FIG. 10).

Figure 13:
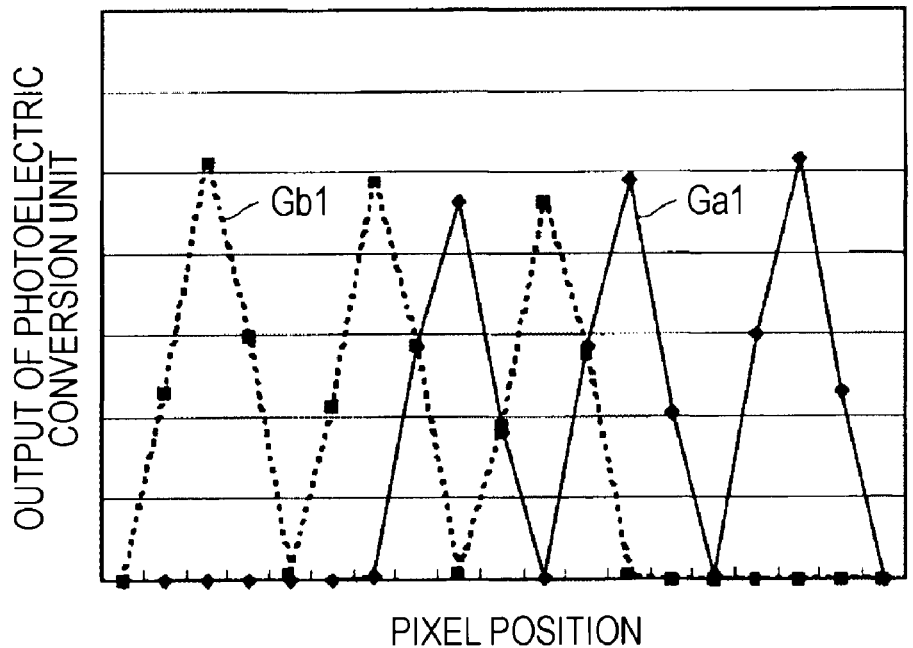
FIG. 13 is a diagram showing a simulation result that is obtained when the focal plane is defocused by 200 μm in the direction close to an imaging area of the imaging element.
Figure 14:
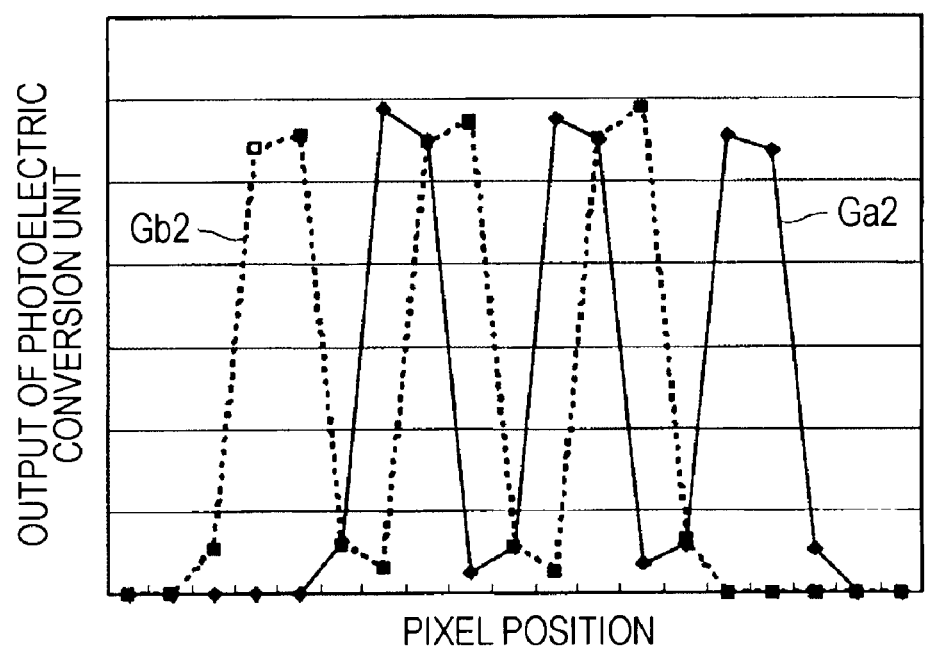
FIG. 14 is a diagram showing a simulation result that is obtained when the focal plane is defocused by 100 μm in the direction close to the imaging area.
Figure 15:
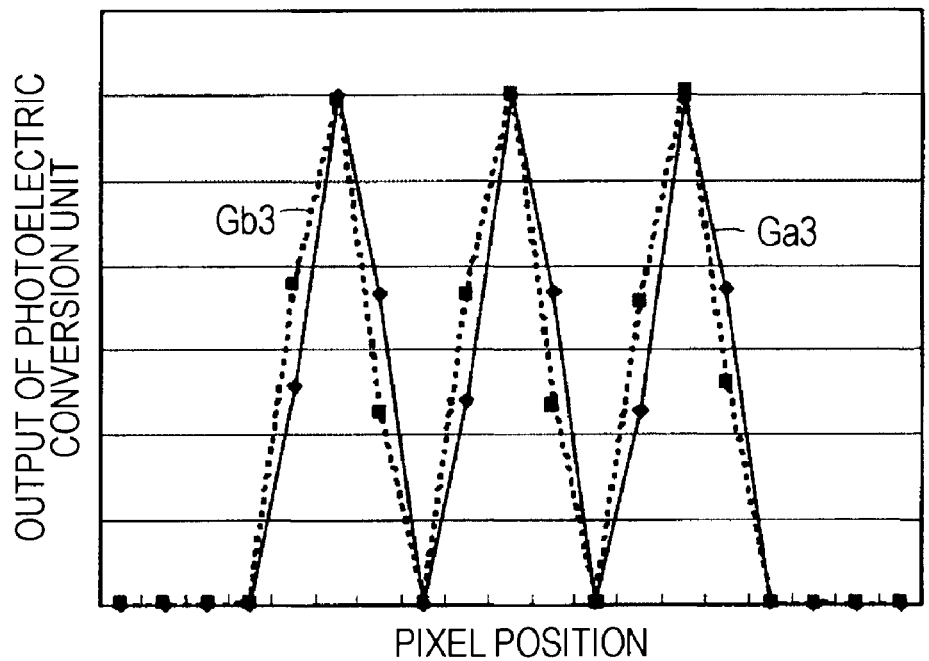
FIG. 15 is a diagram showing a simulation result that is obtained in an in-focus state where the focal plane coincides the imaging area.
Figure 16:
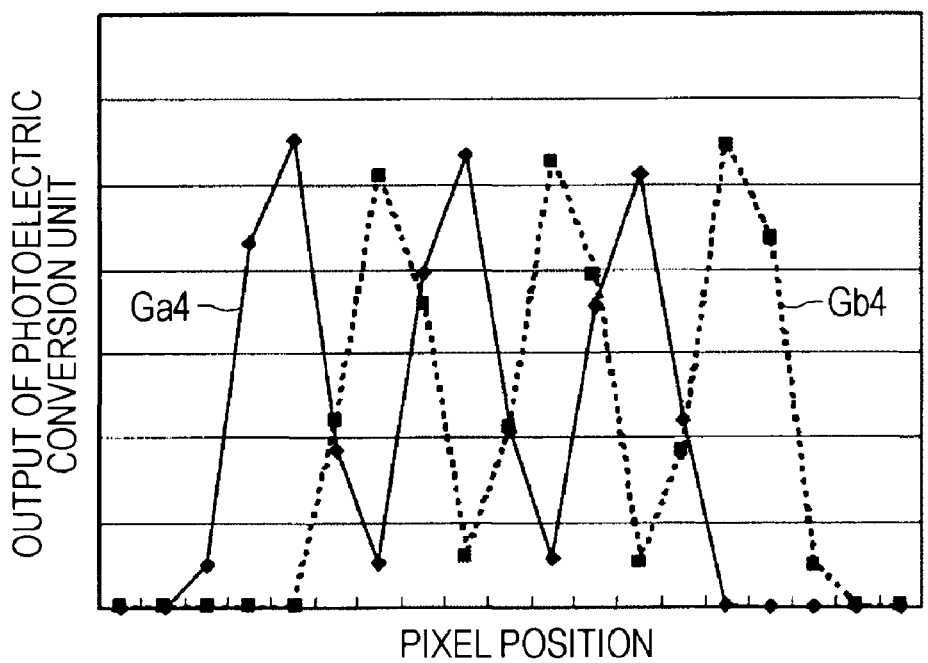
FIG. 16 is a diagram showing a simulation result that is obtained when the focal plane is defocused by 100 μm in the direction far from the imaging area.
Figure 17:
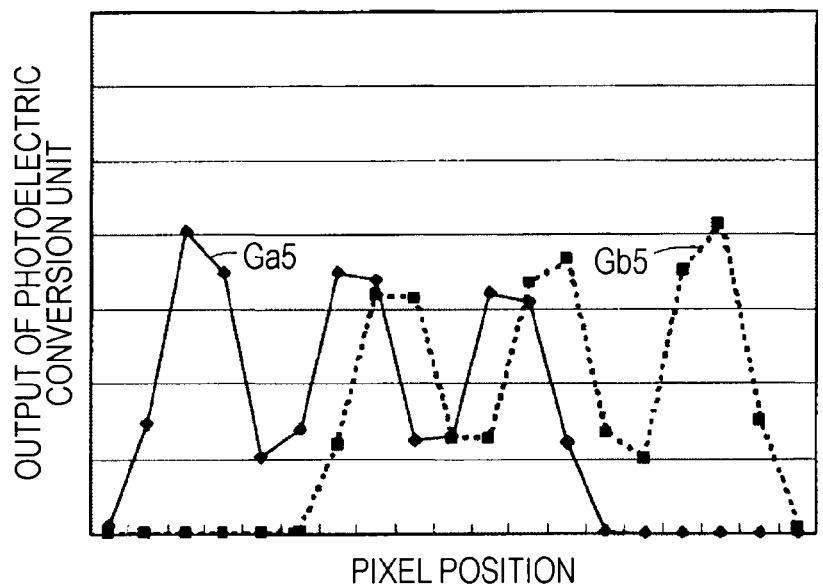
FIG. 17 is a diagram showing a simulation result that is obtained when the focal plane is defocused by 200 μm in the direction far from the imaging area.

FIG. 13 is a diagram showing a simulation result that is obtained when the focal plane is defocused by 200 μm in the direction close to an imaging area of the imaging element 101P, and FIG. 14 is a diagram showing a simulation result that is obtained when the focal plane is defocused by 100 μm in the direction close to the imaging area. FIG. 15 is a diagram showing a simulation result that is obtained in an in-focus state where the focal plane coincides with the imaging area. FIG. 16 is a diagram showing a simulation result that is obtained when the focal plane is defocused by 100 μm in the direction far from the imaging area, and FIG. 17 is a diagram showing a simulation result that is obtained when the focal plane is defocused by 200 μm in the direction far from the imaging area. In FIGS. 13 to 17, the abscissa represents the position of the segmented G pixels 11gr in the direction of the Gr lines L1, and the ordinate represents the output of the photoelectric conversion units 113 and 116. In FIGS. 13 to 17, furthermore, graphs Ga1 to Ga5 (as indicated by solid lines) indicate the A-type data, and graphs Gb1 to Gb5 (as indicated by dotted lines) indicate the B-type data.

Referring to FIGS. 13 to 17, as can be seen from the comparison between A-type image sequences indicated by the "A-type" graphs Ga1 to Ga5 and B-type image sequences indicated by the "B-type" graphs Gb1 to Gb5, the greater the amount of defocus, the greater the amount of shift (amount of deviation) produced between the A-type image sequences and the B-type image sequences in the direction of the Gr lines L1.

Figure 18:
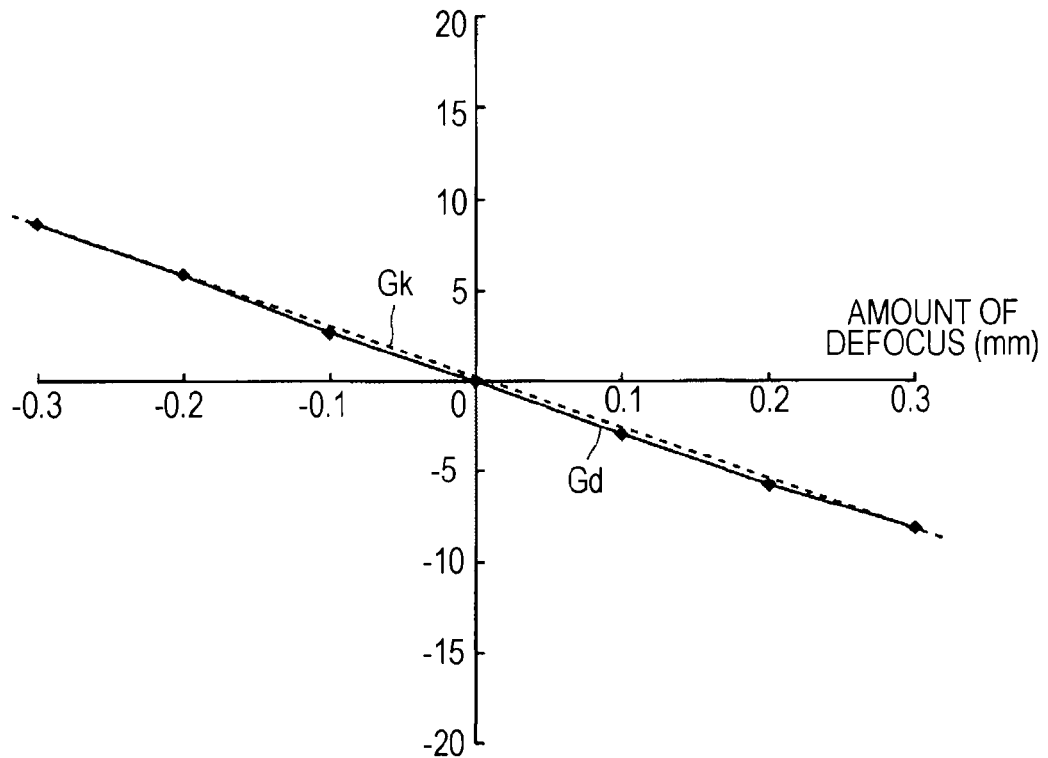
FIG. 18 is a graph showing the relationship between a difference between center of gravity positions of a pair of image sequences and the amount of defocus.

A graph Gd shown in FIG. 18 indicates the relationship between the amount of shift between such a pair of image sequences (i.e., A-type and B-type image sequences) and the amount of defocus. In FIG. 18, the abscissa represents the amount of defocus in millimeters (mm), and the ordinate represents the difference (in terms of the number of pixels) of a center-of-gravity position of a B-type image sequence from a center-of-gravity position of an A-type image sequence. A center-of-gravity position Xg of each image sequence is determined using, for example, Equation (2) as follows:

$$Xg = \frac{X_1 Y_1 + X_2 Y_2 + \ldots + X_n Y_n}{Y_1 + Y_2 + \ldots + Y_n} \quad (2)$$

where $X_1$ to $X_n$ denote pixel positions starting from, for example, the left end in the Gr lines L1, and $Y_1$ to $Y_n$ denote output values from pixels located at the positions $X_1$ to $X_n$.

As indicated by the graph Gd shown in FIG. 18, the relationship between the amount of defocus and the difference between center-of-gravity positions of a pair of image sequences is proportional. When the amount of defocus is represented by DF (μm) and the difference between the center-of-gravity positions is represented by C (μm), this relationship is defined by Equation (3) as follows:

$$DF = k \times C \quad (3)$$

where k denotes a coefficient indicating a gradient Gk (as indicated by a broken line) of the graph Gd shown in FIG. 18. The coefficient k can be obtained in advance during factory test or the like.

Accordingly, the difference (phase difference) between the center-of-gravity positions regarding the A-type data and B-type data obtained from the segmented G pixels 11gr is determined by the phase difference AF calculation circuit 78. Then, the amount of defocus is calculated using Equation (3), and an amount of driving corresponding to the calculated amount of defocus is applied to the focus lens 211. Thus, AF control that allows the focus lens 211 to quickly move to the detected focus position (provisional in-focus position) can be realized. The relationship between the amount of defocus and the amount of driving of the focus lens 211 is uniquely defined by the design value of the interchangeable lens 2 attached to the camera body 10.

In the imaging device 1B, a pair of image sequences is generated on the basis of electric charge signals output from the photoelectric conversion units 113 and 116 of each of the segmented pixels 11*gr*, which have received the subject light fluxes Ta and Tb transmitted through the pair of partial regions in the exit pupil Ep shown in FIG. 12, and the amount of deviation (the amount of shift) between the pair of image sequences in the direction of the Gr lines L1 is detected to perform phase difference AF.

The imaging device 1B described above allows phase difference AF using the segmented G pixels 11*gr* of the imaging element 101P, and also allows contrast AF using the non-segmented G pixels 11*gb* of the imaging element 101P.

In other words, similarly to the imaging device 1A, the imaging device 1B can provide hybrid AF. In AF control based on the hybrid AF method, an operation similar to that of the first embodiment shown in the flowchart of FIG. 7 is executed to achieve advantages similar to those of the imaging device 1A of the first embodiment.

Third Embodiment

An imaging device 1C according to a third embodiment of the present invention has an appearance structure similar to that of the imaging device 1A of the first embodiment shown in FIGS. 1 to 2, but has a different internal structure.

Figure 19:
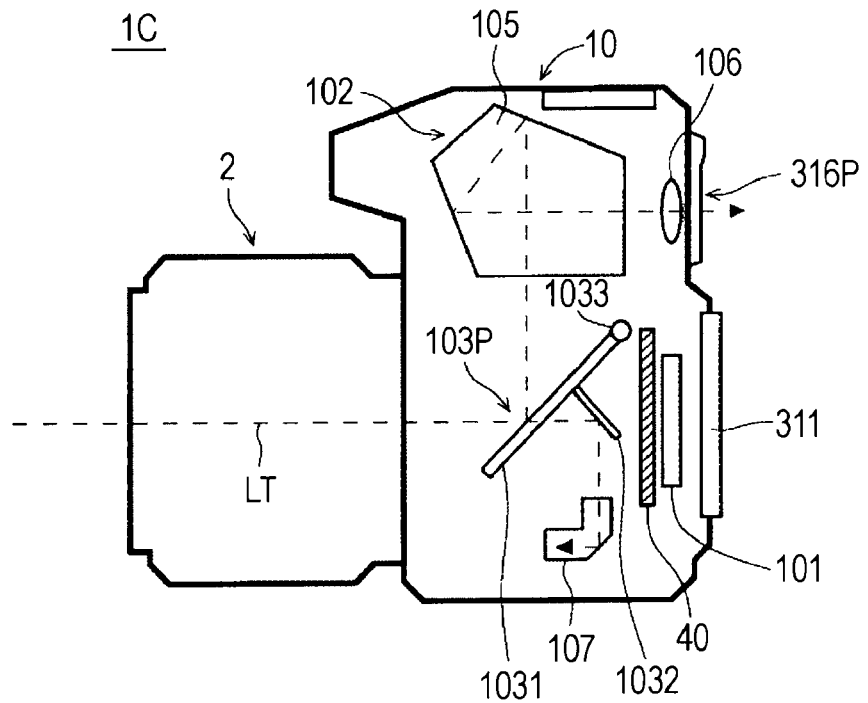
FIG. 19 is a longitudinal cross-sectional view showing an internal structure of an imaging device according to a third embodiment of the present invention.

FIG. 19 is a longitudinal cross-sectional view showing an internal structure of the imaging device 1C.

The imaging device 1C is formed as a general digital SLR camera having an optical finder. The imaging device 1C has a camera body 10 in which an imaging element 101, a shutter unit 40, and a phase difference AF module 107, which have structures similar to those of the first embodiment, are provided. A mirror unit 103P having a structure similar to the mirror unit 103 of the imaging device 1A, and a finder unit (finder optical system) 102 are further provided. Unlike the first embodiment, the imaging element 101 and the shutter unit 40 are arranged in a plane perpendicular to an optical axis LT of an interchangeable lens 2.

The mirror unit 103P includes a main mirror 1031 and a sub-mirror 1032, which have structures similar to those of the mirror unit 103 of the first embodiment. Unlike the mirror unit 103 of the first embodiment, the mirror unit 103P further includes a rotating shaft 1033.

Figure 20:
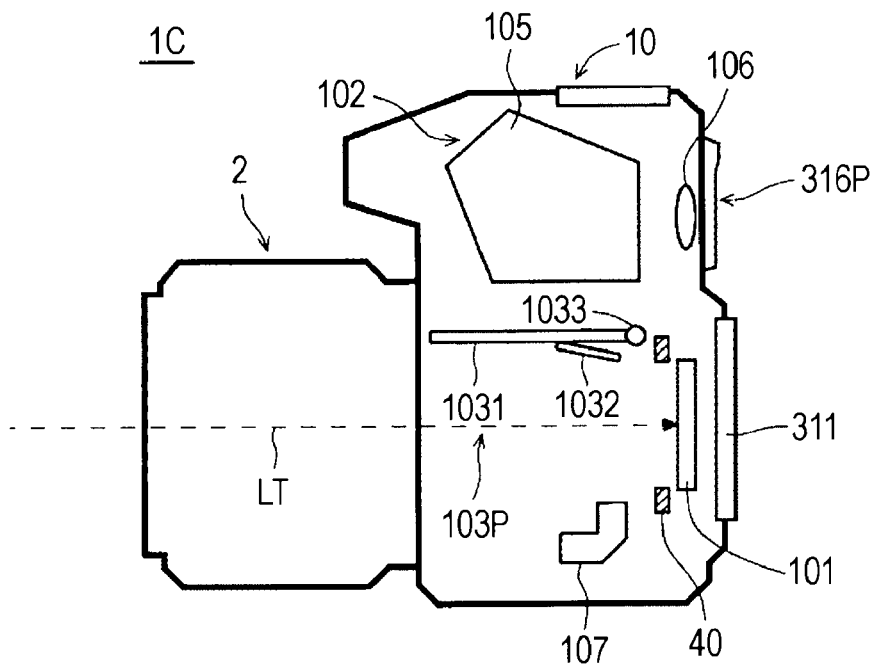
FIG. 20 is a diagram showing a mirror-up state in the imaging device.

The mirror unit 103P is formed as a quick return mirror. During exposure or the like, as shown in FIG. 20, the mirror unit 103P flips up with respect to the rotating shaft 1033, which acts as the fulcrum of rotation (mirror-up state). In this state, the sub-mirror 1032 is folded to lie substantially parallel to the main mirror 1031. This allows subject light coming from the interchangeable lens 2 to reach the imaging element 101 without being blocked by the mirror unit 103P to expose the imaging element 101 to the light. When the imaging operation of the imaging element 101 is finished, the mirror unit 103P is returned to the original position (the position shown in FIG. 19) (mirror-down state).

The finder unit 102 includes an eyepiece 106 having a structure similar to that of the first embodiment, a pentaprism 105, and an optical viewfinder (OVF) 316P. The pentaprism 105 is a prism having a pentagon shape in cross section in which a subject optical image entering from a lower surface thereof is internally reflected so that the optical image is turned upside-down and right-left reversed to form an erect image. The eyepiece 106 directs the subject image formed into the erect image by the pentaprism 105 to the outside of the OVF 316P. With this configuration, the finder unit 102 functions as an optical finder for allowing a user to visually check the subject during a shooting standby mode.

An electrical structure of the imaging device 1C having the internal structure described above will now be described.

Figure 21:
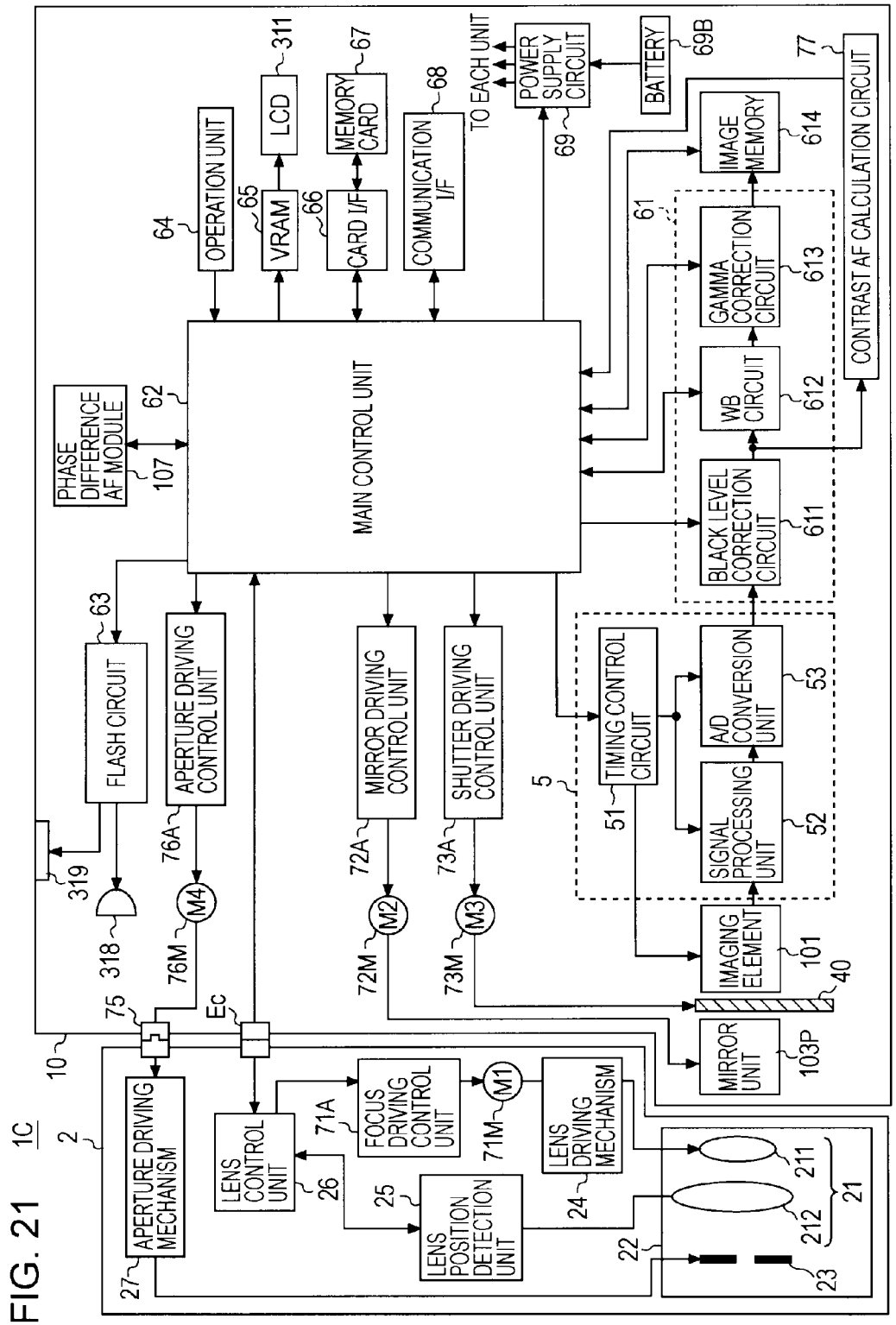
FIG. 21 is a block diagram showing an electrical structure of the imaging device.

FIG. 21 is a block diagram showing an electrical structure of the imaging device 1C.

The imaging device 1C has an electrical structure similar to that of the imaging device 1A (see FIG. 4) of the first embodiment. Since, as described above, the OVF 316P is provided, the EVF 316 and VRAM 65*b*, which are provided in the imaging device 1A (see FIG. 4), are omitted.

The imaging device 1C further includes a mirror driving actuator 72M and a mirror driving control unit 72A that are configured to drive the mirror unit 103P.

The mirror driving control unit 72A is configured to generate a driving signal for driving the mirror driving actuator 72M in synchronization with the timing of shooting operation. The mirror driving actuator 72M is an actuator that drives the mirror unit 103P to rotate to a horizontal position (mirror-up position) or an inclined position (mirror-down position).

Unlike the imaging devices 1A and 1B described above, the imaging device 1C having the structure described above does not allow phase difference AF and contrast AF at the same time. In other words, the imaging device 1C does not allow parallel processes including a process (provisional position detection process) of detecting a provisional in-focus position using the phase difference AF method and a process (focus information obtaining process) of obtaining an AF evaluation value (focus detection information) on the basis of an image signal generated by the imaging element 101 at each position of the focus lens 211 driven by the AF actuator 71M. However, as with the imaging devices 1A and 1B, the imaging device 1C can also achieve high-speed and high-precision AF control by performing the operation described below.

Figure 22:
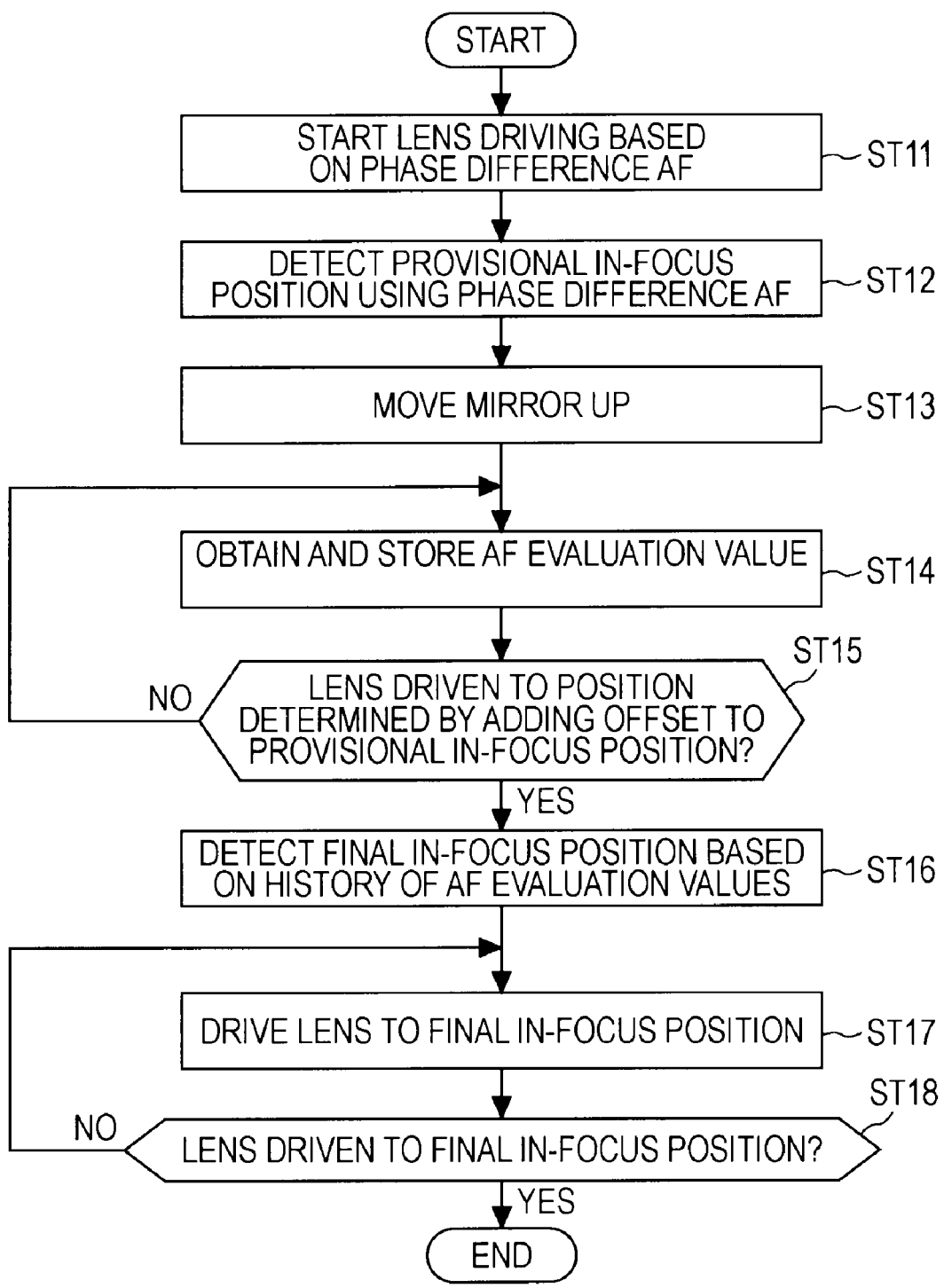
FIG. 22 is a flowchart showing a basic operation of the imaging device.
Figure 23:
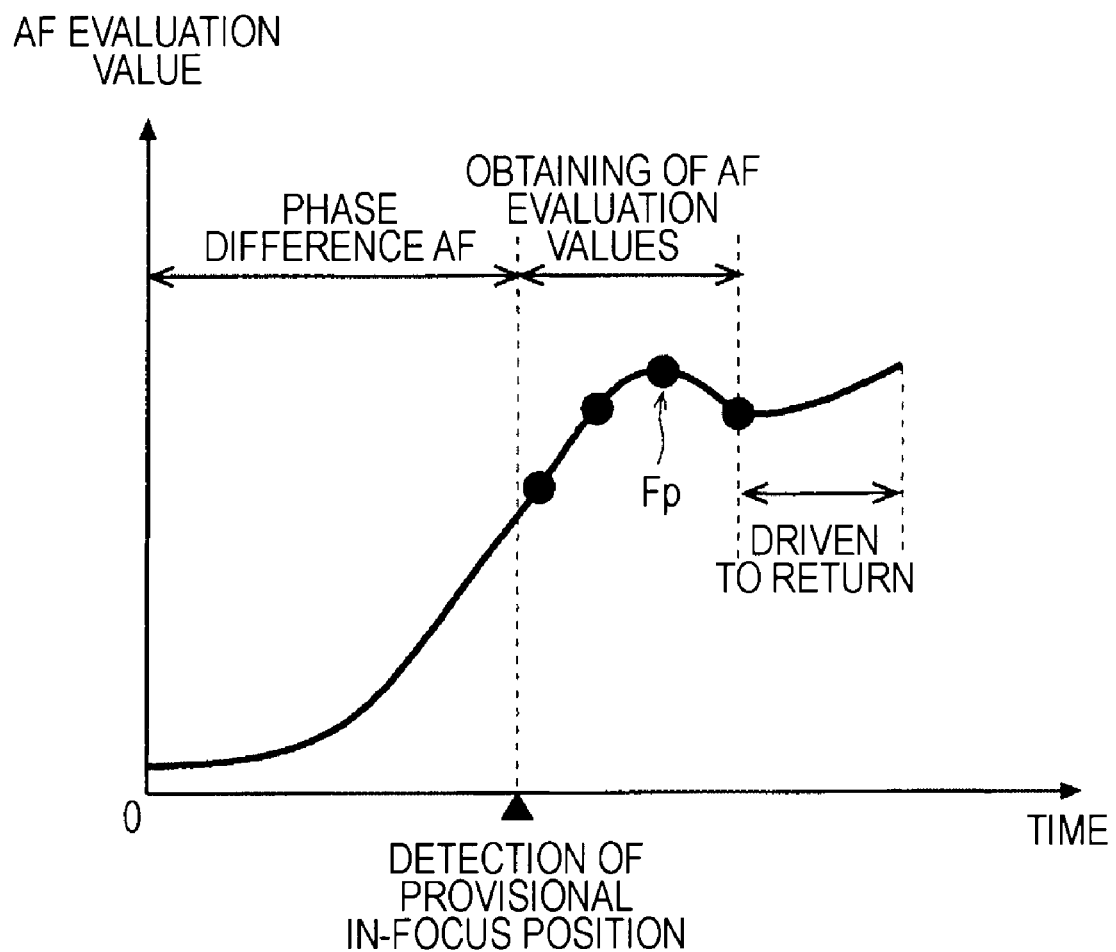
FIG. 23 is a diagram showing the operation of the imaging device.

FIG. 22 is a flowchart showing a basic operation of the imaging device 1C. The operation of the imaging device 1C shown in FIG. 22 corresponds to, in particular, an AF control operation after the shutter button 307 is half-pressed, and is executed by the main control unit 62 of the imaging device 1C. FIG. 23 is a diagram, corresponding to FIG. 6B, showing the operation of the imaging device 1C.

In step ST11, as in step ST1 shown in FIG. 7, the driving of the focus lens 211 based on the phase difference AF method is started in response to an output signal of the phase difference AF module 107. In this case, the mirror unit 103P is in the mirror-down state shown in FIG. 19. Thus, the imaging element 101 is not allowed to receive subject light or to obtain an AF evaluation value used in the contrast AF method.

In step ST12, a provisional in-focus position of the focus lens 211 is detected by the phase difference AF method.

In step ST13, the mirror driving actuator 72M drives the mirror unit 103P into the mirror-up state shown in FIG. 20. In the mirror-up state, the phase difference AF module 107 is not allowed to receive subject light, and the phase difference AF method is not enabled. However, the imaging element 101 is allowed to receive subject light, and the contrast AF method is enabled.

In step ST14, as in step ST2 shown in FIG. 7, AF evaluation values used in the contrast AF method are obtained at individual positions of the focus lens 211 during the driving of the focus lens 211, and are stored in the RAM of the main control unit 62. As shown in FIG. 23, the process for obtaining the AF evaluation values is started after a provisional in-focus position has been detected by the phase difference AF method, that is, when an in-focus position is estimated. The driving of the focus lens 211 in the period during which the AF evaluation values are obtained is controlled not using the contrast AF method but by simply driving the focus lens 211 to the stop position (which is determined by adding the offset α to the provisional in-focus position) (open-loop control).

With the processing of step ST14, AF evaluation values for individual positions of the focus lens 211 are obtained at least for a certain range of positions.

In steps ST15 to ST18, processing similar to that of steps ST3 to ST6 shown in FIG. 7 is performed.

With the operation of the imaging device 1C described above, advantages similar to those of the imaging device 1A of the first embodiment or the imaging device 1B of the second embodiment can be achieved.

MODIFICATIONS

The offset (pass-through amount) in the foregoing embodiments may not necessarily be set as a distance by which a focus lens moves from a provisional in-focus position, and may be set as a period of time during which a focus lens moves from a provisional in-focus position.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   imaging means for obtaining an image signal relating to a subject;
   driving means for driving a focus lens;
   first detecting means for performing focus detection based on a contrast detection method to detect an in-focus position of the focus lens;
   second detecting means for performing focus detection based on a phase difference detection method, while the focus lens is being driven by the driving means toward the in-focus position, to execute a provisional position detection process of detecting a provisional in-focus position of the focus lens; and
   in-focus control means for controlling the driving means to drive the focus lens to pass through the provisional in-focus position and then return to the in-focus position,
   wherein the first detecting means includes
      means for executing a focus information obtaining process of obtaining, based on image signals obtained by the imaging means at individual positions of the focus lens driven by the driving means, focus detection information that is used for focus detection based on the contrast detection method, and
      means for executing an in-focus position detection process of detecting the in-focus position on the basis of the focus detection information obtained in the focus information obtaining process, and
   wherein the in-focus control means includes
      determining means for determining a stop position of the focus lens by adding a predetermined pass-through amount to the provisional in-focus position detected in the provisional position detection process,
      first driving control means for controlling driving of the focus lens so that the focus lens moves to the stop position through the provisional in-focus position,
      focus information storing means for obtaining and storing focus detection information in predetermined storage means, the focus detection information being obtained by performing the focus information obtaining process at least for a given range of positions during the driving of the focus lens controlled by the first driving control means, and
      second driving control means for controlling driving of the focus lens so that the focus lens reaches an in-focus position that is detected by performing the in-focus position detection process on the basis of the focus detection information stored in the predetermined storage means, wherein
   the focus information obtaining process and the provisional position detection process are performed in parallel, and
   the focus information obtaining process is started before the provisional in-focus position is detected in the provisional position detection process.

2. An in-focus control method for driving a focus lens to an in-focus position in an imaging device, the imaging device including imaging means for obtaining an image signal relating to a subject, and driving means for driving the focus lens, the in-focus control method comprising the steps of
   performing focus detection based on a contrast detection method to detect the in-focus position;
   performing focus detection based on a phase difference detection method, while the focus lens is being driven by the driving means toward the in-focus position, to execute a provisional position detection process of detecting a provisional in-focus position of the focus lens; and
   controlling the driving means to drive the focus lens to pass through the provisional in-focus position and then return to the in-focus position,
   wherein the step of detecting includes
      executing a focus information obtaining process of obtaining, based on image signals obtained by the imaging means at individual positions of the focus lens driven by the driving means, focus detection information that is used for focus detection based on the contrast detection method, and
      executing an in-focus position detection process of detecting the in-focus position on the basis of the focus detection information obtained in the focus information obtaining process, and
   wherein the step of controlling includes
      determining a stop position of the focus lens by adding a predetermined pass-through amount to the provisional in-focus position detected in the provisional position detection process,
      driving the focus lens to move to the stop position through the provisional in-focus position,
      obtaining focus detection information by performing the focus information obtaining process at least for a given range of positions during the driving of the focus lens to move to the stop position through the provisional in-focus position, and storing the obtained focus detection information in predetermined storage means in the imaging device, and
      detecting the in-focus position by performing the in-focus position detection process on the basis of the focus detection information stored in the predetermined storage means, and driving the focus lens to the detected in-focus position, wherein
   the focus information obtaining process and the provisional position detection process are performed in parallel, and the focus information obtaining process is started before the provisional in-focus position is detected in the provisional position detection process.

3. An imaging device comprising:
an imaging unit configured to obtain an image signal relating to a subject;
a driving unit configured to drive a focus lens;
a first detecting unit configured to perform focus detection based on a contrast detection method to detect an in-focus position of the focus lens;
a second detecting unit configured to perform focus detection based on a phase difference detection method, while the focus lens is being driven by the driving unit toward the in-focus position, to execute a provisional position detection process of detecting a provisional in-focus position of the focus lens; and
an in-focus control unit configured to control the driving unit to drive the focus lens to pass through the provisional in-focus position and then return to the in-focus position,
wherein the first detecting unit includes
a unit configured to execute a focus information obtaining process of obtaining, based on image signals obtained by the imaging unit at individual positions of the focus lens driven by the driving unit, focus detection information that is used for focus detection based on the contrast detection method, and
a unit configured to execute an in-focus position detection process of detecting the in-focus position on the basis of the focus detection information obtained in the focus information obtaining process, and wherein the in-focus control unit includes
a determining unit configured to determine a stop position of the focus lens by adding a predetermined pass-through amount to the provisional in-focus position detected in the provisional position detection process,
a first driving control unit configured to control driving of the focus lens so that the focus lens moves to the stop position through the provisional in-focus position,
a focus information storing unit configured to obtain and store focus detection information in predetermined storage unit, the focus detection information being obtained by performing the focus information obtaining process at least for a given range of positions during the driving of the focus lens controlled by the first driving control unit, and
a second driving control unit configured to control driving of the focus lens so that the focus lens reaches an in-focus position that is detected by performing the in-focus position detection process on the basis of the focus detection information stored in the predetermined storage unit, wherein
the focus information obtaining process and the provisional position detection process are performed in parallel, and
the focus information obtaining process is started before the provisional in-focus position is detected in the provisional position detection process.

* * * * *